United States Patent
Bhardwaj et al.

(10) Patent No.: US 11,407,601 B1
(45) Date of Patent: Aug. 9, 2022

(54) CONTAINER LAYER GRIPPING SYSTEMS AND METHODS

(71) Applicant: Amazon Technologies, Inc., Seattle, WA (US)

(72) Inventors: Abhinav Bhardwaj, Aberdeen (GB); Matteo Camelin, Luxembourg (LU); Tolga Kol, Luxembourg (LU); Stefano La Rovere, Bereldange (LU)

(73) Assignee: Amazon Technologies, Inc., Seattle, WA (US)

( * ) Notice: Subject to any disclaimer, the term of this patent is extended or adjusted under 35 U.S.C. 154(b) by 395 days.

(21) Appl. No.: 16/573,363

(22) Filed: Sep. 17, 2019

(51) Int. Cl.
*B65G 61/00* (2006.01)
*B65G 59/02* (2006.01)

(52) U.S. Cl.
CPC ............. *B65G 59/02* (2013.01); *B65G 61/00* (2013.01); *B65G 2201/025* (2013.01); *B65G 2203/0283* (2013.01)

(58) Field of Classification Search
CPC .. B65G 59/02; B65G 61/00; B65G 2201/025; B65G 2203/0283; B25J 15/0052; B25J 15/0014; B66F 9/063
USPC .......... 414/799, 622; 294/81.5, 81.54, 81.55, 294/81.62
See application file for complete search history.

(56) References Cited

U.S. PATENT DOCUMENTS

| | | | | |
|---|---|---|---|---|
| 4,621,852 | A * | 11/1986 | Maki | B25J 15/10 |
| | | | | 294/67.22 |
| 7,938,614 | B2 * | 5/2011 | Fritzsche | B65G 57/06 |
| | | | | 414/793.4 |
| 10,040,203 | B2 * | 8/2018 | Ochiishi | B25J 15/0253 |
| 10,343,857 | B2 * | 7/2019 | Morency | B65G 59/02 |
| 10,710,822 | B2 * | 7/2020 | Tommesani | B65G 59/02 |
| 2005/0244259 | A1 * | 11/2005 | Chilson | G05D 1/024 |
| | | | | 414/664 |
| 2010/0014954 | A1 * | 1/2010 | Henderson | B65G 57/24 |
| | | | | 414/795.4 |
| 2013/0236285 | A1 * | 9/2013 | Maurissen | B66F 9/183 |
| | | | | 414/800 |
| 2015/0246444 | A1 * | 9/2015 | Guidi | B25J 11/00 |
| | | | | 414/729 |
| 2020/0016770 | A1 * | 1/2020 | Kamranzadeh | B25J 15/0014 |
| 2020/0270072 | A1 * | 8/2020 | Sforacchi | B65G 57/24 |
| 2020/0369498 | A1 * | 11/2020 | Ekshinge | B66F 17/003 |

\* cited by examiner

*Primary Examiner* — Lynn E Schwenning
(74) *Attorney, Agent, or Firm* — Athorus, PLLC

(57) ABSTRACT

Container gripping systems and methods may include a plurality of arm assemblies and at least one fork assembly that are configured to align, grip, lift, transfer, and release a layer of containers between locations. Each of the plurality of arm assemblies and the at least one fork assembly of a container gripping apparatus may move between respective retracted positions, in which portions of containers are gripped or supported, and extended positions, in which portions of containers are released or unsupported. Further, a movement device, such as a robotic arm, may couple to a container gripping apparatus and may manipulate the apparatus to align, grip, lift, transfer, and release a layer of containers between locations.

20 Claims, 14 Drawing Sheets

CONTAINER LAYER GRIPPING SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Various material handling systems and processes, including receipt, sorting, storage, packing, shipping, or other processing of items within a material handling facility, often incur significant cost and time. Accordingly, there is a need for flexible and automated systems and methods to facilitate the various material handling processes within a material handling facility, thereby improving the speed and efficiency of such processes.

DETAILED DESCRIPTION

Figure 1A:
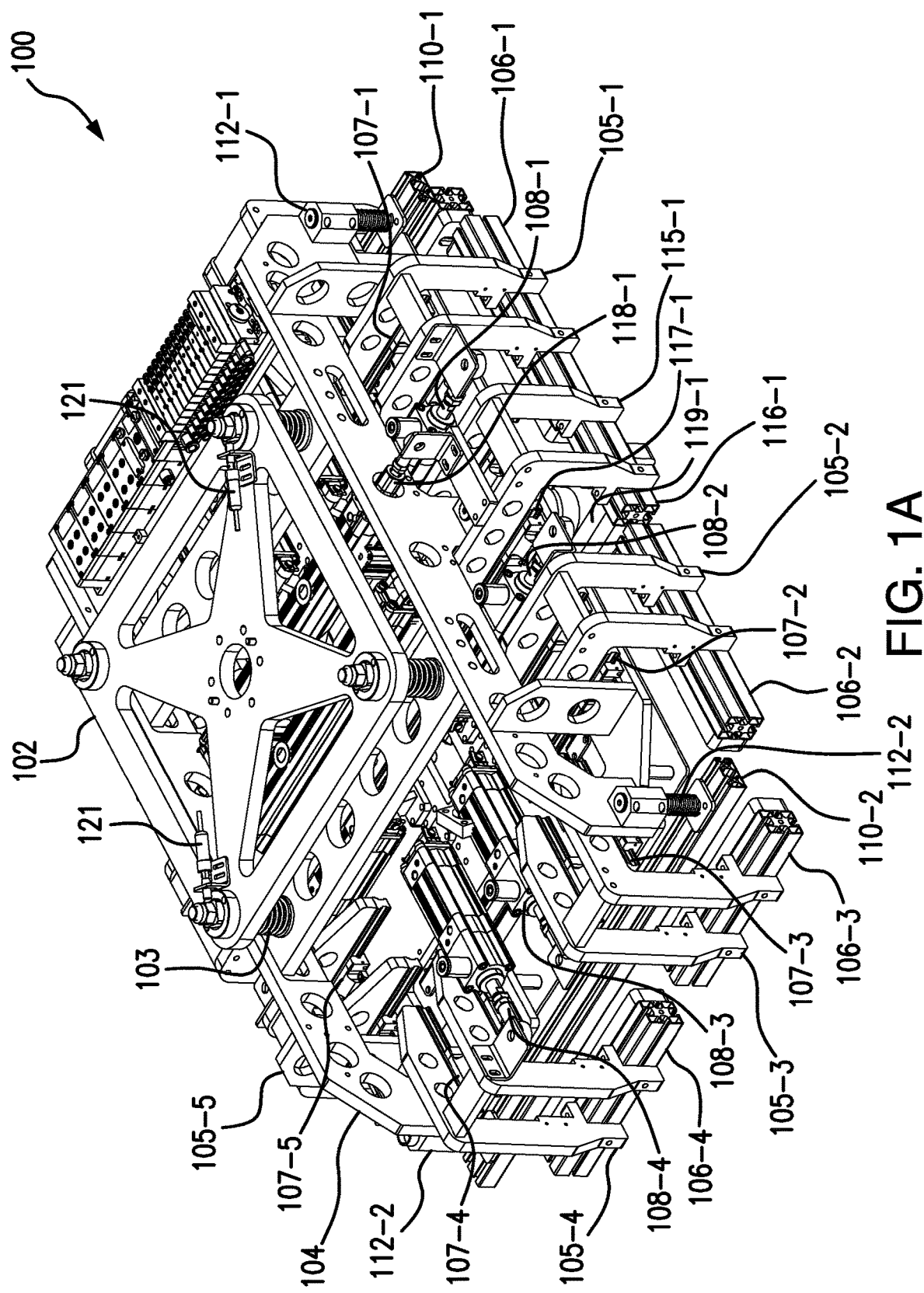
FIG. 1A is an upper, perspective view diagram of an example container gripping system with retracted arm assemblies and fork assemblies, in accordance with implementations of the present disclosure.

As is set forth in greater detail below, implementations of the present disclosure are directed to container gripping systems and methods that can align, lift, transfer, and release a layer of containers between locations, e.g., between stacks of containers and/or upstream or downstream stations or processes.

In example embodiments, a container gripping system or apparatus may include a frame, a support plate, a plurality of container gripping arm assemblies, and a plurality of container gripping fork assemblies. The support plate may couple the container gripping apparatus with a movement device, such as a robotic arm or a gantry system, that is configured to move and manipulate the container gripping apparatus.

Each of the plurality of container gripping arm assemblies may be configured to slide laterally toward and away from the frame between a retracted position and an extended position. In the extended position, the plurality of container gripping arm assemblies may be separated from a layer of containers to be gripped by the container gripping apparatus. In the retracted position, the plurality of container gripping arm assemblies may contact side surfaces and/or undersides of structural ribs or edges of a layer of containers in order to lift and move the layer of containers.

In addition, each of the plurality of container gripping fork assemblies may be configured to slide laterally toward and away from the frame between a retracted position and an extended position. In the extended position, the plurality of container gripping fork assemblies may be separated or removed from inner edges of adjacent containers of a layer of containers to be gripped by the container gripping apparatus. In the retracted position, the plurality of container gripping fork assemblies may be inserted into and contact undersides of inner structural ribs or edges of adjacent containers of a layer of containers in order to lift and move the layer of containers.

Further, a controller may control various operations of the movement device and the container gripping apparatus to align, lift, transfer, and release a layer of containers between locations. The controller may also be in communication with an imaging device, or vision system, in order to align the container gripping apparatus with a layer of containers to be gripped. Moreover, the container gripping apparatus may include one or more sensors associated with various components, e.g., support plate, upper support bars, container gripping arm assemblies, and/or container gripping fork assemblies, that are configured to detect alignment, forces, and/or pressures between the various components of the container gripping apparatus and one or more containers of a layer of containers.

In example embodiments, the container gripping apparatus may be configured to align, lift, transfer, and release a layer of containers including one, two, three, or four containers, such as rectangular or square totes or bins. In other example embodiments, the container gripping apparatus may be sized, shaped, and/or configured to align, lift, transfer, and release a layer of containers including other numbers, types, sizes, or shapes of containers, totes, bins, or trays.

Using the container gripping systems and methods described herein, a layer of containers may be reliably and quickly moved between locations, such as upstream stations or processes, stacks of containers, and/or downstream stations or processes, thereby improving the speed and efficiency of such material handling processes.

Figure 1B:
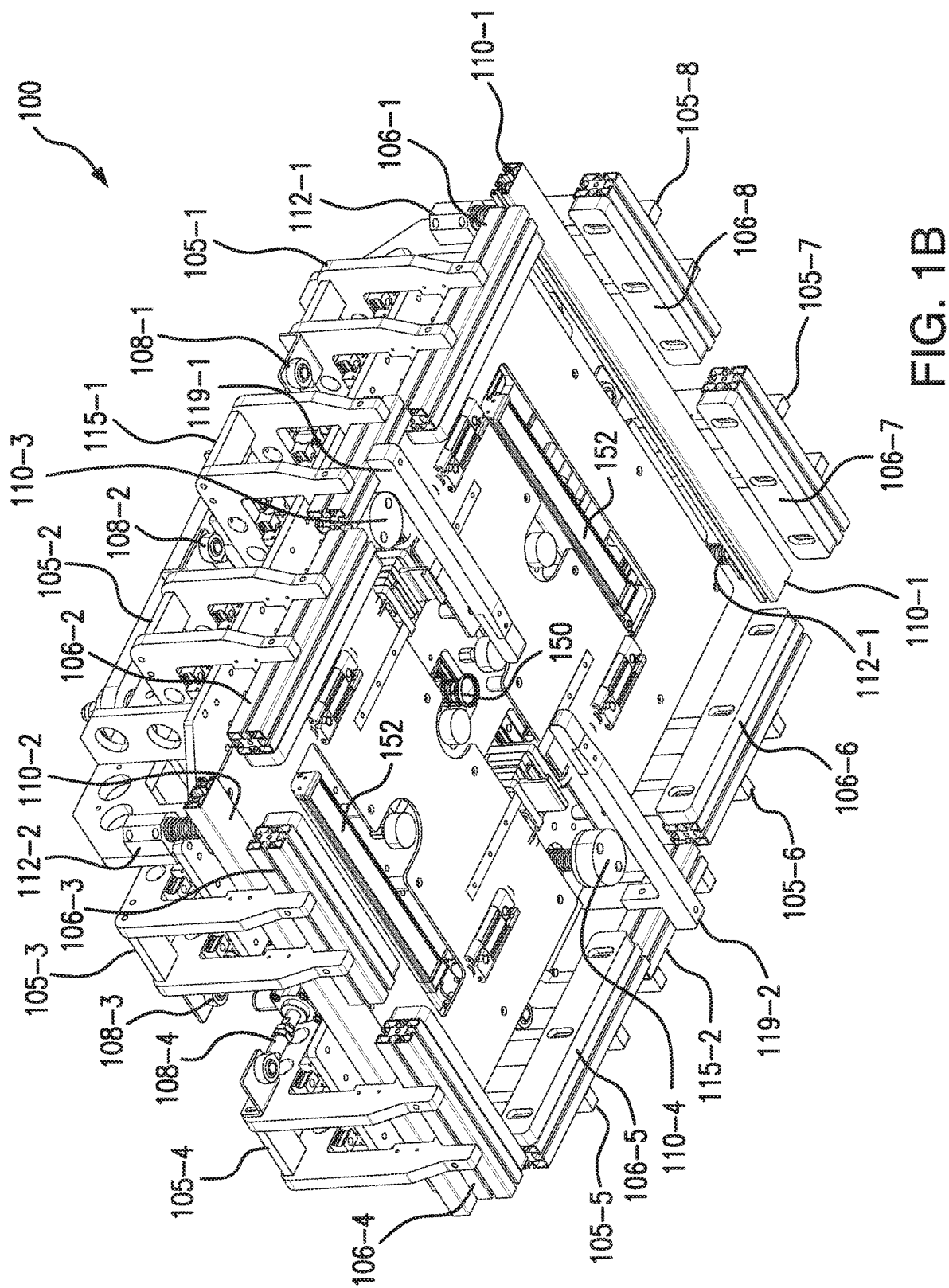
FIG. 1B is a lower, perspective view diagram of the example container gripping system with retracted arm assemblies and fork assemblies, in accordance with implementations of the present disclosure.

FIG. 1A is an upper, perspective view diagram of an example container gripping system 100 with retracted arm assemblies and fork assemblies, in accordance with implementations of the present disclosure. FIG. 1B is a lower, perspective view diagram of the example container gripping system 100 with retracted arm assemblies and fork assemblies, in accordance with implementations of the present disclosure.

Figure 2A:
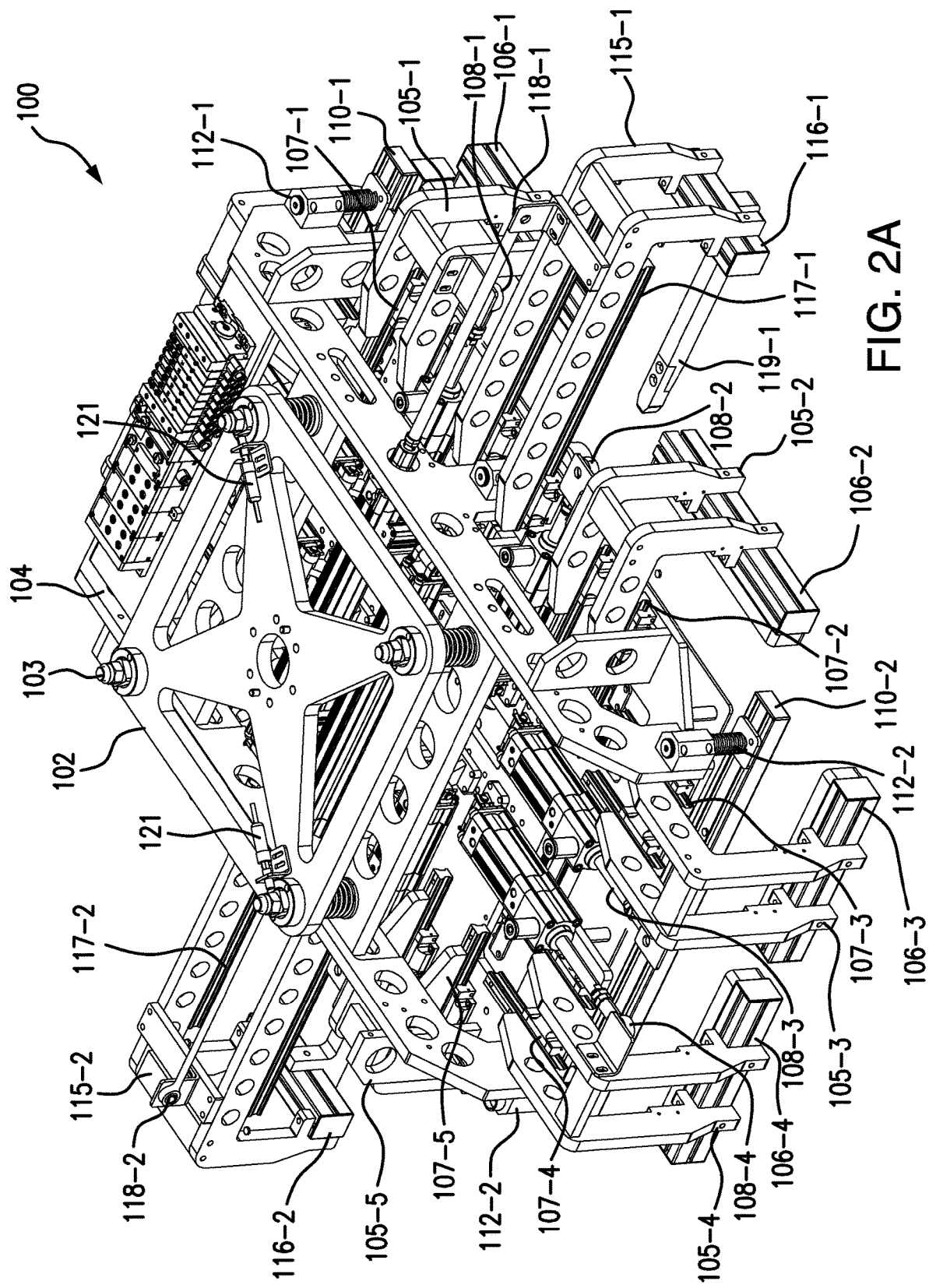
FIG. 2A is an upper, perspective view diagram of an example container gripping system with extended arm assemblies and fork assemblies, in accordance with implementations of the present disclosure.
Figure 2B:
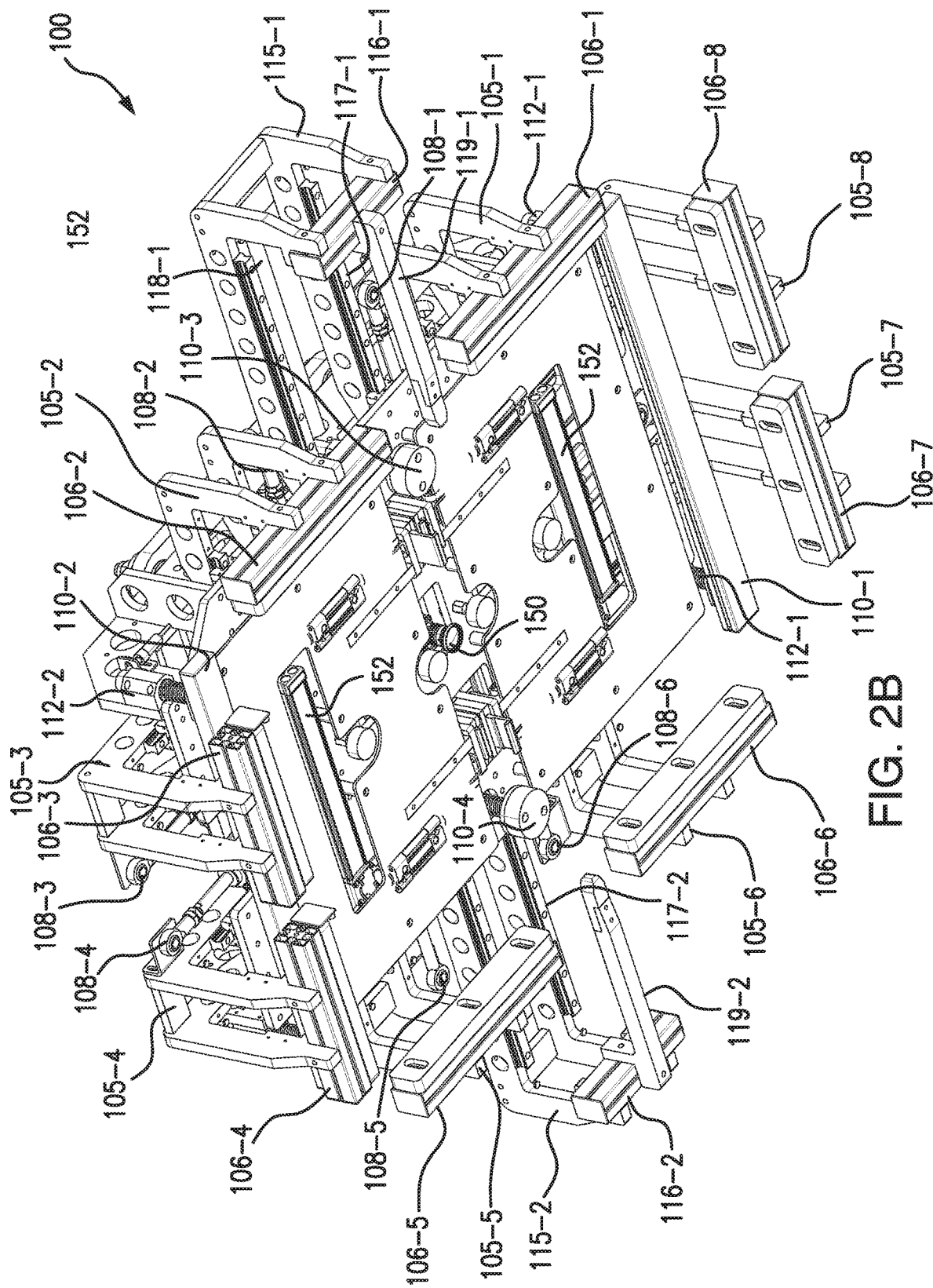
FIG. 2B is a lower, perspective view diagram of the example container gripping system with extended arm assemblies and fork assemblies, in accordance with implementations of the present disclosure.

In addition, FIG. 2A is an upper, perspective view diagram of an example container gripping system 100 with extended arm assemblies and fork assemblies, in accordance with implementations of the present disclosure. FIG. 2B is a lower, perspective view diagram of the example container gripping system 100 with extended arm assemblies and fork assemblies, in accordance with implementations of the present disclosure.

As shown in FIGS. 1A-2B, the example container gripping system or apparatus 100 may include a frame 104, a support plate 102 coupled to the frame 104, one or more upper support bars 110, a plurality of container gripping arm assemblies (or a plurality of arm assemblies), and a plurality of container gripping fork assemblies (or a plurality of fork assemblies). Various components of the container gripping apparatus 100, such as the frame 104, support plate 102, one or more upper support bars 110, the plurality of arm assemblies, and/or the plurality of fork assemblies may be formed of steel, aluminum, other metals, plastics, composites, other materials, or combinations thereof.

The frame 104 may comprise one or more plates, beams, rods, brackets, or other structural members to which various components of the container gripping apparatus 100 may be coupled. For example, the various components coupled to the frame 104 may comprise various sensors, actuators, and/or movable components, such as the support plate 102, one or more upper support bars 110, the plurality of arm assemblies, and/or the plurality of fork assemblies. Although FIGS. 1A-2B show the frame 104 shaped substantially as a rectangular prism, in other example embodiments, the frame 104 may have other shapes or sizes, e.g., circular, oval, triangular, hexagonal, octagonal, or other regular or irregular shapes and sizes.

The support plate 102 may comprise one or more plates, beams, rods, brackets, or other structural members configured to couple the container gripping apparatus 100 with a movement device. For example, the movement device may comprise a robotic arm or machine, a gantry system, and/or other mechatronic, electromechanical, or automated movement systems, machines, or equipment. Via the coupling between the support plate 102 of the container gripping apparatus 100 and a movement device, such as a robotic arm, the movement device may move and/or manipulate the container gripping apparatus 100 in order to align, lift, transfer, and/or release a layer of containers between locations with respect to various processes. Although FIGS. 1A-2B show the support plate 102 shaped substantially as a square plate, in other example embodiments, the support plate 102 may have other shapes or sizes, e.g., circular, oval, triangular, hexagonal, octagonal, or other regular or irregular shapes and sizes.

The support plate 102 may be coupled to the frame 104 by one or more spring-loaded connections 103 to provide compliance and/or to correct for misalignment during various operations using the container gripping apparatus 100. For example, each spring-loaded connection 103 may comprise a fastener, bolt, screw, rod, or pin that may extend through a corresponding hole of the support plate 102, extend through a compression spring, and connect to a portion of the frame 104. The support plate 102 may be held or trapped between a head or end of the fastener, bolt, screw, rod, or pin and the compression spring, and the compression spring may also be held or trapped between the support plate 102 and the frame 104. Responsive to loading or pushing the support plate 102 toward the frame 104, the support plate 102 may at least partially compress the compression spring. Although FIGS. 1A-2B show the support plate 102 coupled to the frame 104 by four spring-loaded connections 103 positioned at corners of the support plate 102, in other example embodiments, the support plate 102 may be coupled to the frame 104 by a different number of spring-loaded connections 103 at different locations relative to the support plate 102 and/or the frame 104.

Further, one or more of the spring-loaded connections 103 between the support plate 102 and the frame 104 may include a sensor 121, such as a proximity sensor, photoeye, other presence detection sensor, or other types of sensors. For example, the sensor 121 may be configured to detect compression of the support plate 102 relative to the frame 104 in order to detect alignment between the support plate 102 and the frame 104 (as well as alignment between the support plate 102 and a plane associated with a layer of containers). In one example, the sensor 121 may comprise a photoeye that is blocked by a portion of the fastener, bolt, screw, rod, or pin of the spring-loaded connection 103 when the support plate 102 is not loaded and the compression spring is not compressed, and that is unblocked by the portion of the fastener, bolt, screw, rod, or pin of the spring-loaded connection 103 when the support plate 102 is loaded and the compression spring is compressed, or vice versa. Based on data received from one or more sensors 121 associated with the one or more spring-loaded connections 103 responsive to loading, a controller may determine an amount or degree of misalignment between the support plate 102 and the frame 104 (as well as an amount or degree of misalignment between the support plate 102 and a plane associated with a layer of containers) during various operations. Although FIGS. 1A-2B show sensors 121 associated with two of the spring-loaded connections 103, in other example embodiments, the sensor 121 may comprise other numbers, types, or configurations of sensors, such as proximity sensors, presence detection sensors, imaging sensors, or others, to detect alignment between the support plate 102 and the frame 104. In addition, the sensor may comprise pressure sensors or force sensors associated with the support plate 102 and/or one or more of the spring-loaded connections 103 configured to detect an amount of load applied between the support plate 102 and the frame 104.

The one or more upper support bars 110 may comprise one or more plates, beams, rods, brackets, or other structural members configured to contact upper sides of one or more outer edges of a layer of containers to be gripped by the container gripping apparatus 100. Although FIGS. 1A-2B show the upper support bars 110-1, 110-2 shaped substantially as extended bars, beams, plates, or rods, in other example embodiments, the upper support bars 110 may have other shapes or sizes, e.g., circular, oval, triangular, rectangular, square, hexagonal, octagonal, or other regular or irregular shapes and sizes, such as upper support bars 110-3, 110-4 shown in FIGS. 1B and 2B that are circular and contact upper sides of outer edges or corners of adjacent containers of the layer of containers. Further, although FIGS. 1A-2B show two upper support bars 110-1, 110-2 on opposite sides of the frame 104, in other example embodiments, other numbers and arrangements of upper support bars 110 may be included, such as zero upper support bars, one upper support bar on each side of the container gripping apparatus 100 for a total of four upper support bars, one upper support bar for each outer edge of respective containers of a layer of containers to be gripped by the container gripping apparatus 100, upper support bars associated with corners of respective containers, and/or other numbers and arrangements.

The upper support bars 110 may be coupled to the frame 104 by one or more spring-loaded connections 112 to provide compliance and/or to correct for misalignment during various operations using the container gripping apparatus 100. For example, each spring-loaded connection 112 may comprise a fastener, bolt, screw, rod, or pin that may extend through a corresponding hole of a portion of the frame 104, extend through a compression spring, and connect to a portion of the upper support bar 110. The portion of the frame 104 may be held or trapped between a head or end of the fastener, bolt, screw, rod, or pin and the compression spring, and the compression spring may also be held or trapped between the frame 104 and the upper support bar 110. Responsive to loading or pushing the upper support bar 110 toward the frame 104 via contact with upper sides of outer edges of a layer of containers, the upper support bar 110 may at least partially compress the compression spring. Although FIGS. 1A-2B show the upper support bars 110 coupled to the frame 104 by two spring-loaded connections 112 positioned at opposite ends of the upper support bars 110, in other example embodiments, the upper support bars 110 may be coupled to the frame 104 by a different number of spring-loaded connections 112 at different locations relative to the upper support bars 110 and/or the frame 104.

Further, similar to the discussion above with respect to sensors 121 associated with spring-loaded connections 103, one or more of the spring-loaded connections 112 between the upper support bars 110 and the frame 104 may include a sensor (not shown), such as a proximity sensor, photoeye, other presence detection sensor, or other types of sensors. For example, the sensor may be configured to detect compression of an upper support bar 110 relative to the frame 104 in order to detect alignment between the upper support bar 110 and the frame 104 (as well as alignment between the upper support bar 110 and a plane associated with upper sides of outer edges of a layer of containers). In one example, the sensor may comprise a photoeye that is blocked by a portion of the fastener, bolt, screw, rod, or pin of the spring-loaded connection 112 when the upper support bar 110 is not loaded and the compression spring is not compressed, and that is unblocked by the portion of the fastener, bolt, screw, rod, or pin of the spring-loaded connection 112 when the upper support bar 110 is loaded and the compression spring is compressed, or vice versa. Based on data received from one or more sensors associated with the one or more spring-loaded connections 112 responsive to loading, a controller may determine an amount or degree of misalignment between the upper support bars 110 and the frame 104 (as well as an amount or degree of misalignment between the upper support bars 110 and a plane associated with upper sides of outer edges of a layer of containers) during various operations. In other example embodiments, the sensor may comprise other numbers, types, or configurations of sensors, such as proximity sensors, presence detection sensors, imaging sensors, or others, to detect alignment between the upper support bars 110 and the frame 104. In addition, the sensor may comprise pressure sensors or force sensors associated with the upper support bars 110 and/or one or more of the spring-loaded connections 112 configured to detect an amount of load applied between the upper support bars 110 and upper sides of outer edges of a layer of containers.

In example embodiments, the container gripping apparatus 100 may include a plurality of arm assemblies movably coupled to and arranged around the frame 104. Each arm assembly may include a support arm 105, a gripping member 106, a sliding connection 107 to the frame 104, and an actuator 108. For example, a first arm assembly may include a first support arm 105-1, a first gripping member 106-1, a first sliding connection 107-1, and a first actuator 108-1, a second arm assembly may include a second support arm 105-2, a second gripping member 106-2, a second sliding connection 107-2, and a second actuator 108-2, a third arm assembly may include a third support arm 105-3, a third gripping member 106-3, a third sliding connection 107-3, and a third actuator 108-3, a fourth arm assembly may include a fourth support arm 105-4, a fourth gripping member 106-4, a fourth sliding connection 107-4, and a fourth actuator 108-4, a fifth arm assembly may include a fifth support arm 105-5, a fifth gripping member 106-5, a fifth sliding connection 107-5, and a fifth actuator 108-5, a sixth arm assembly may include a sixth support arm 105-6, a sixth gripping member 106-6, a sixth sliding connection (not visible in FIGS. 1A-2B), and a sixth actuator 108-6, a seventh arm assembly may include a seventh support arm 105-7, a seventh gripping member 106-7, a seventh sliding connection (not visible in FIGS. 1A-2B), and a seventh actuator (not visible in FIGS. 1A-2B), and an eighth arm assembly may include an eighth support arm 105-8, an eighth gripping member 106-8, an eighth sliding connection (not visible in FIGS. 1A-2B), and an eighth actuator (not visible in FIGS. 1A-2B). Various components of the plurality of arm assemblies, or portions thereof, that may not be visible or illustrated in FIGS. 1A-2B comprise similar shapes, sizes, and features as other similar components of the plurality of arm assemblies. Although FIGS. 1A-2B show two arm assemblies on each side of the frame 104 for a total of eight arm assemblies, in other example embodiments, other numbers, configurations, or arrangements of arm assemblies may be movably coupled to and arranged around the frame 104.

Each support arm 105 may comprise one or more plates, beams, rods, brackets, or other structural members movably coupled to the frame 104 via one or more sliding connections 107. For example, as shown in FIGS. 1A-2B, each support arm 105 may comprise two L-shaped brackets coupled together via one or more connecting beams, and each of the two L-shaped brackets may include a sliding connection 107 to a portion of the frame 104. In addition, each sliding connection 107 may comprise one or more guides, tracks, or channels, one or more rails, racks, bars, poles, or beams, one or more bearings, rollers, or other friction-reducing elements, and/or other structures that may be similar to drawer slides or glides.

In addition, a gripping member 106 may be coupled to an end (e.g., a lower end) of each support arm 105. For example, each gripping member 106 may comprise one or more plates, beams, rods, brackets, or other structural members to contact side surfaces and/or undersides of outer structural ribs or edges of respective containers of a layer of containers to be gripped by the container gripping apparatus 100. In some example embodiments, each gripping member 106 may also include a compliant material, such as rubber, silicone, plastic, other compliant, flexible, and/or resilient materials, or combinations thereof, on inner surfaces that are intended to contact and grip side surfaces and/or undersides of outer structural ribs or edges of respective containers.

Further, an actuator 108 may be coupled between a portion of the frame 104 and each support arm 105, e.g., via brackets, fasteners, and/or other coupling members. For example, each actuator 108 may comprise servos, solenoids, pneumatic cylinders, hydraulic cylinders, screw or worm drive actuators, rack and pinion actuators, or other types of linear actuators. In this manner, each actuator 108 may be configured to move or slide a respective arm assembly, including a support arm 105, a gripping member 106, a portion of a sliding connection 107, and a portion of the actuator 108, between at least a retracted position that is closer to a center point or center line of the frame 104 and an extended position that is farther from a center point or a center line of the frame 104 via the sliding connection 107 to the frame 104. For example, as shown in FIGS. 1A and 1B, the retracted position may be a position in which a portion of the gripping member 106, such as a compliant material on an inner surface of the gripping member 106, contacts and grips a side surface and/or an underside of an outer structural rib or edge of a container. In addition, as shown in FIGS. 2A and 2B, the extended position may be a position in which the portion of the gripping member 106, such as a compliant material on an inner surface of the gripping member 106, is separated from or maintains clearance to a side surface and/or an underside of an outer structural rib or edge of a container.

In example embodiments in which the container gripping apparatus 100 is configured to align, lift, transfer, and release a layer of containers that includes a plurality of containers, such as two, three, four, or more containers, the plurality of arm assemblies may align (or correct the alignment of) the plurality of containers prior to lifting the containers. For example, responsive to the sliding movement of each of the plurality of arm assemblies from respective extended positions to respective retracted positions around a plurality of containers, gripping members of the plurality of arm assemblies may contact side surfaces and/or undersides of outer structural ribs or edges of respective containers and push, move, reorient, and align the plurality of containers with each other and with the container gripping apparatus, such that the apparatus may accurately and reliably lift the layer of containers together. In some example embodiments, the gripping members and arm assemblies of the container gripping apparatus may correct misalignments of individual containers within a layer of containers of up to approximately fifty millimeters, or smaller or greater amounts of misalignment, away from respective expected, desired, or aligned positions of the containers.

Further, each gripping member of the plurality of arm assemblies may be coupled to the respective support arm by one or more spring-loaded connections (not shown) to provide compliance and/or to correct for misalignment during various operations using the container gripping apparatus 100. For example, each spring-loaded connection may comprise a fastener, bolt, screw, rod, or pin that may extend through a corresponding hole of a portion of a support arm, extend through a compression spring, and connect to the gripping member. The portion of the support arm may be held or trapped between a head or end of the fastener, bolt, screw, rod, or pin and the compression spring, and the compression spring may also be held or trapped between the portion of the support arm and the gripping member. Responsive to loading or pushing the gripping member toward the support arm via contact with a side surface and/or an underside of an outer structural rib or edge of a container, the gripping member may at least partially compress the compression spring. In example embodiments, the gripping members may be coupled to respective support arms by various numbers of spring-loaded connections at different locations relative to the gripping members and/or the support arms.

Further, similar to the discussion above with respect to sensors 121 associated with spring-loaded connections 103, one or more of the spring-loaded connections between the gripping members and the support arms may include a sensor (not shown), such as a proximity sensor, photoeye, other presence detection sensor, or other types of sensors. For example, the sensor may be configured to detect compression of a gripping member relative to a respective support arm in order to detect alignment between the gripping member and the support arm (as well as alignment between the gripping member and a plane associated with a side surface and/or underside of an outer structural rib or edge of a container). In one example, the sensor may comprise a photoeye that is blocked by a portion of the fastener, bolt, screw, rod, or pin of the spring-loaded connection when the gripping member is not loaded and the compression spring is not compressed, and that is unblocked by the portion of the fastener, bolt, screw, rod, or pin of the spring-loaded connection when the gripping member is loaded and the compression spring is compressed, or vice versa. Based on data received from one or more sensors associated with the one or more spring-loaded connections responsive to loading, a controller may determine an amount or degree of misalignment between the gripping members and respective support arms (as well as an amount or degree of misalignment between the gripping members and planes associated with respective side surfaces and/or undersides of outer structural ribs or edges of containers) during various operations. In other example embodiments, the sensor may comprise other numbers, types, or configurations of sensors, such as proximity sensors, presence detection sensors, imaging sensors, or others, to detect alignment between the gripping members and respective support arms.

In other example embodiments, the sensor may comprise pressure sensors or force sensors configured to detect an amount of load applied between the gripping members and side surfaces and/or undersides of outer structural ribs or edges of containers. For example, pressure or force sensors may be associated with spring-loaded connections between the gripping members and the support arms and/or coupled to inner surfaces of gripping members that are intended to contact and apply pressure or force to side surfaces and/or undersides of outer structural ribs or edges of containers. Moreover, in some example embodiments, the actuators may also function or operate as sensors to detect pressure or force feedback responsive to actuation of the plurality of arm assemblies. Then, gripping and movement of containers by gripping members of the arm assemblies may be controlled based at least in part on the detected pressure or force between the gripping members and side surfaces and/or undersides of outer structural ribs or edges of containers to ensure accurate and reliable aligning, lifting, transferring, and releasing of containers.

Although FIGS. 1A-2B show particular numbers, sizes, shapes, configurations, and arrangements of support arms, gripping members, sliding connections, and actuators, in other example embodiments, various other numbers, sizes, shapes, configurations, and arrangements of support arms, gripping members, sliding connections, and actuators may be included in a container gripping apparatus or system. For example, a single support arm may be coupled to two or more gripping members, two or more support arms may be coupled to a single gripping member, a single support arm may have a single sliding connection, a single support arm may have two or more sliding connections, two or more support arms may have a single sliding connection, a single support arm may include a plurality of actuators, two or more support arms may include a single actuator, two or more support arms on opposite sides of the frame may include a single actuator, a single arm assembly may be configured to contact side surfaces of two or more containers concurrently, two or more arm assemblies may be configured to contact a side surface of a single container concurrently, and/or various other combinations, configurations, and arrangements.

In example embodiments, the container gripping apparatus 100 may include at least one fork assembly, or a plurality of fork assemblies, movably coupled to and arranged around the frame 104. Each fork assembly may include a support member 115, a gripping member 116 including a gripping fork 119, a sliding connection 117 to the frame 104, and an actuator 118. For example, a first fork assembly may include a first support member 115-1, a first gripping member 116-1 including a first gripping fork 119-1, a first sliding connection 117-1, and a first actuator 118-1, and a second fork assembly may include a second support member 115-2, a second gripping member 116-2 including a second gripping fork 119-2, a second sliding connection 117-2, and a second actuator 118-2. Although FIGS. 1A-2B show a respective fork assembly on opposite sides of the frame 104 for a total of two fork assemblies, in other example embodiments, other numbers, configurations, or arrangements of fork assemblies may be movably coupled to and arranged around the frame 104, such as one fork assembly or more than two fork assemblies.

Each support member 115 may comprise one or more plates, beams, rods, brackets, or other structural members movably coupled to the frame 104 via one or more sliding connections 117. For example, as shown in FIGS. 1A-2B, each support member 115 may comprise two L-shaped brackets coupled together via one or more connecting beams, and each of the two L-shaped brackets may include a sliding connection 117 to a portion of the frame 104. In addition, each sliding connection 117 may comprise one or more guides, tracks, or channels, one or more rails, racks, bars, poles, or beams, one or more bearings, rollers, or other friction-reducing elements, and/or other structures that may be similar to drawer slides or glides.

In addition, a gripping member 116 and gripping fork 119 may be coupled to an end (e.g., a lower end) of each support member 115. For example, each gripping member 116 and gripping fork 119 may comprise one or more plates, beams, rods, brackets, or other structural members to contact undersides of inner structural ribs or edges of respective containers of a layer of containers to be gripped by the container gripping apparatus 100. In addition, each gripping fork 119 may be sized and shaped to fit within and be inserted into a gap between adjacent containers, e.g., between side surfaces of adjacent, aligned containers, in order to contact and lift containers via undersides of inner structural ribs or edges of containers. In some example embodiments, each gripping member 116 and gripping fork 119 may also include a compliant material, such as rubber, silicone, plastic, other compliant, flexible, and/or resilient materials, or combinations thereof, on surfaces that are intended to contact and grip undersides of inner structural ribs or edges of respective containers.

Further, an actuator 118 may be coupled between a portion of the frame 104 and each support member 115, e.g., via brackets, fasteners, and/or other coupling members. For example, each actuator 118 may comprise servos, solenoids, pneumatic cylinders, hydraulic cylinders, screw or worm drive actuators, rack and pinion actuators, or other types of linear actuators. In this manner, each actuator 118 may be configured to move or slide a respective fork assembly, including a support member 115, a gripping member 116 and gripping fork 119, a portion of a sliding connection 117, and a portion of the actuator 118, between at least a retracted position that is closer to a center point or center line of the frame 104 and an extended position that is farther from a center point or a center line of the frame 104 via the sliding connection 117 to the frame 104. For example, as shown in FIGS. 1A and 1B, the retracted position may be a position in which at least a portion of the gripping member 116 and gripping fork 119 is inserted between side surfaces of adjacent containers to contact and grip undersides of inner structural ribs or edges of the adjacent containers. In addition, as shown in FIGS. 2A and 2B, the extended position may be a position in which the at least a portion of the gripping member 116 and gripping fork 119 is removed or separated from side surfaces of adjacent containers and/or undersides of inner structural ribs or edges of the adjacent containers. In example embodiments, in order to insert or remove the gripping forks 119 of the fork assemblies relative to a layer of containers, the fork assemblies may be configured for relatively greater sliding movement between respective retracted and extended positions as compared to the sliding movement of the gripping members of the arm assemblies between respective retracted and extended positions.

In example embodiments in which the container gripping apparatus 100 is configured to align, lift, transfer, and release a layer of containers that includes a plurality of containers, such as two, three, four, or more containers, the plurality of fork assemblies may be inserted into one or more gaps between adjacent containers to support inner structural ribs or edges of the adjacent containers during lifting of the containers. For example, responsive to the sliding movement of each of the plurality of fork assemblies from respective extended positions to respective retracted positions into gaps between adjacent containers of a plurality of containers, gripping members and gripping forks of the plurality of fork assemblies may contact undersides of inner structural ribs or edges of adjacent containers and provide support to the inner structural ribs or edges of the plurality of containers, such that the apparatus may accurately and reliably lift the layer of containers together.

Further, each gripping member of the plurality of fork assemblies may be coupled to the respective support member by one or more spring-loaded connections (not shown) to provide compliance and/or correct for misalignment during various operations using the container gripping apparatus 100. For example, each spring-loaded connection may comprise a fastener, bolt, screw, rod, or pin that may extend through a corresponding hole of a portion of a support member, extend through a compression spring, and connect to a portion of the gripping member. The portion of the support member may be held or trapped between a head or end of the fastener, bolt, screw, rod, or pin and the compression spring, and the compression spring may also be held or trapped between the support member and the gripping member. Responsive to loading or pushing the gripping member toward the support member via contact with a side surface and/or an underside of an inner structural rib or edge of a container, the gripping member may at least partially compress the compression spring. In example embodiments, the gripping members may be coupled to respective support members by various numbers of spring-loaded connections at different locations relative to the gripping members and/or the support members.

Further, similar to the discussion above with respect to sensors 121 associated with spring-loaded connections 103, one or more of the spring-loaded connections between the gripping members and the support members may include a sensor (not shown), such as a proximity sensor, photoeye, other presence detection sensor, or other types of sensors. For example, the sensor may be configured to detect compression of a gripping member relative to a respective support member in order to detect alignment between the gripping member and the support member (as well as alignment between the gripping member and fork and a plane associated with undersides of inner structural ribs or edges of adjacent containers). In one example, the sensor may comprise a photoeye that is blocked by a portion of the fastener, bolt, screw, rod, or pin of the spring-loaded connection when the gripping member is not loaded and the compression spring is not compressed, and that is unblocked by the portion of the fastener, bolt, screw, rod, or pin of the spring-loaded connection when the gripping member is loaded and the compression spring is compressed, or vice versa. Based on data received from one or more sensors associated with the one or more spring-loaded connections responsive to loading, a controller may determine an amount or degree of misalignment between the gripping members and respective support members (as well as an amount or degree of misalignment between the gripping members and corresponding forks and planes associated with respective undersides of inner structural ribs or edges of adjacent containers) during various operations. In other example embodiments, the sensor may comprise other numbers, types, or configurations of sensors, such as proximity sensors, presence detection sensors, imaging sensors, or others, to detect alignment between the gripping members and respective support members.

In other example embodiments, the sensor may comprise pressure sensors or force sensors configured to detect an amount of load applied between the gripping forks and undersides of inner structural ribs or edges of adjacent containers. For example, pressure or force sensors may be associated with spring-loaded connections between the gripping members and the support members and/or coupled to surfaces of gripping forks that are intended to contact and apply pressure or force to undersides of inner structural ribs or edges of adjacent containers. Moreover, in some example embodiments, the actuators may also function or operate as sensors to detect pressure or force feedback responsive to actuation of the plurality of fork assemblies. Then, gripping and movement of containers by gripping members and corresponding forks of the fork assemblies may be controlled based at least in part on the detected pressure or force to ensure accurate and reliable insertion, lifting, transferring, and releasing of containers.

Although FIGS. 1A-2B show particular numbers, sizes, shapes, configurations, and arrangements of support members, gripping members, gripping forks, sliding connections, and actuators, in other example embodiments, various other numbers, sizes, shapes, configurations, and arrangements of support members, gripping members, gripping forks, sliding connections, and actuators may be included in a container gripping apparatus or system. For example, a single support member may be coupled to two or more gripping members, two or more support members may be coupled to a single gripping member, a single gripping member may be coupled to two or more gripping forks, two more gripping members may be coupled to a single gripping fork, a single support member may have a single sliding connection, a single support member may have two or more sliding connections, two or more support members may have a single sliding connection, a single support member may include a plurality of actuators, two or more support members may include a single actuator, two or more support members on opposite sides of the frame may include a single actuator, a single fork assembly may be configured to contact undersides of inner structural ribs or edges of two or more containers concurrently, two or more fork assemblies may be configured to contact an underside of an inner structural rib or edge of a single container concurrently, and/or various other combinations, configurations, and arrangements.

In additional example embodiments, a container gripping apparatus may also include a vision system 150, such as an imaging device, camera, infrared sensor, depth sensor, other type of imaging sensor, or combinations thereof, that may capture imaging data associated with operations of the container gripping apparatus 100, a movement device coupled to the container gripping apparatus 100, and/or one or more downstream stations or processes, as described in more detail herein. In example embodiments, the vision system 150 may be positioned or coupled to a portion of the container gripping apparatus 100, e.g., a center of an underside of the frame of the container gripping apparatus as shown in FIGS. 1B and 2B. Further, the container gripping apparatus may also include one or more lights, light emitting diodes (LEDs), or other illumination elements 152 to provide illumination and facilitate capture of imaging data by the vision system 150, and the illumination elements 152 may also be positioned or coupled to a portion of the container gripping apparatus 100, e.g., an underside of the frame of the container gripping apparatus as shown in FIGS. 1B and 2B.

In further example embodiments, a container gripping apparatus may also include one or more plates, guards, screens, rails, or other components that are configured to at least partially cover upper sides of the layer of containers. For example, the one or more plates, guards, screens, rails, or other components may be associated with or coupled to the frame, e.g., an underside of the frame, may be associated with or coupled to one or more arm assemblies, and/or may be associated with or coupled to one or more fork assemblies. In this manner, the one or more plates, guards, screens, rails, or other components may prevent objects within respective containers of a layer of containers from moving and/or falling out of the containers during alignment, lifting, transferring, and/or releasing of the layer of containers by the container gripping apparatus.

In still further example embodiments, a container gripping apparatus may also include one or more stops, plates, guards, rails, or other components that are configured to prevent movement of one or more containers of a layer of containers that are gripped by the apparatus. For example, the one or more stops, plates, guards, rails, or other components may be associated with or coupled to the frame, e.g., an underside of the frame, at spaces, interfaces, or gaps between adjacent containers of a layer of containers, may be associated with or coupled to one or more arm assemblies at spaces, interfaces, or gaps between adjacent containers of a layer of containers, and/or may be associated with or coupled to one or more fork assemblies at spaces, interfaces, or gaps between adjacent containers of a layer of containers. In this manner, the one or more stops, plates, guards, rails, or other components may prevent movement of one or more containers of a layer of containers that are gripped by the apparatus during alignment, lifting, transferring, and/or releasing of the layer of containers by the container gripping apparatus. In one example, if a container gripping apparatus grips a layer of containers that is less than a full capacity of containers associated with the apparatus, e.g., an apparatus that has the capacity to grip a layer of containers having four containers instead grips less than four containers, such as one, two, or three containers, the one or more stops, plates, guards, rails, or other components may prevent movement of one or more containers of the layer of containers that are gripped by the apparatus to other unoccupied positions within the gripping capacity of the apparatus during alignment, lifting, transferring, and/or releasing of the layer of containers by the container gripping apparatus.

FIGS. 3A-3G are schematic diagrams 300A-300G of an example container gripping tool operation process, in accordance with implementations of the present disclosure.

As shown in FIGS. 3A-3G, a container gripping apparatus 100 may be coupled via a support plate to a movement device, such as a robotic arm 325. The robotic arm 325 may move and/or manipulate the container gripping apparatus 100 in order to align, lift, transfer, and release one or more layers of containers between locations, such as stacks 330 of containers 332 that may be placed on a pallet 334 and/or upstream or downstream stations or processes, which may include conveyors 340, other material handling equipment, apparatus, or systems, processing stations, sorting stations, packing stations, storage locations, etc. As shown in FIGS. 3A-3G, the stack 330 of containers 332 may include twelve containers, 332-1, 332-2, 332-3, 332-4, 332-5, 332-6, 332-7, 332-8, 332-9, 332-10, 332-11, etc. stacked in three layers, with each layer including four containers.

In addition, a vision system 350, such as an imaging device, camera, infrared sensor, depth sensor, other type of imaging sensor, or combinations thereof, may capture imaging data associated with operations of the container gripping apparatus 100, the robotic arm 325, and/or the conveyor 340. In example embodiments, the vision system 350 may be associated with and/or fixed in a location within a material handling facility, may be associated with a movable or robotic apparatus or equipment, and/or may be associated with or coupled to a portion of the container gripping apparatus 100 (such as the vision system 150 shown in FIGS. 1B and 2B) and/or the robotic arm 325.

Further, a controller, or control system, may be in communication with each of the container gripping apparatus 100, the robotic arm 325, the conveyor 340, and/or the vision system 150, 350 in order to send and receive data associated with operations of each of the various components, and/or in order to control and coordinate operations of each of the various components. For example, movements of the robotic arm 325 may be controlled, instructed, or commanded based on imaging data received from the vision system 150, 350, movements of the robotic arm 325 may be controlled, instructed, or commanded based on sensor data received from sensors associated with the container gripping apparatus 100, actuations of the arm assemblies and fork assemblies of the container gripping apparatus 100 may be controlled, instructed, or commanded based on imaging data received from the vision system 150, 350, actuations of the arm assemblies and fork assemblies of the container gripping apparatus 100 may be controlled, instructed, or commanded based on sensor data received from sensors associated with the container gripping apparatus 100, operations of the conveyor 340 may be controlled, instructed, or commanded based on imaging data received from the vision system 150, 350, and/or operations of the conveyor 340 may be controlled, instructed, or commanded based on movements, manipulations, or actuations of the robotic arm 325 and/or the container gripping apparatus 100.

In some example embodiments, a vision system 150, 350 may capture imaging data from an overhead view of a stack 330 of containers 332 in order to detect positions and/or orientations of one or more containers of a layer of containers. For example, the vision system 150, 350 may utilize various image processing techniques or algorithms, such as edge, line, object, surface, and/or feature detection techniques or algorithms, in order to detect positions and/or orientations of one or more containers of a layer of containers. Based on the detected positions and/or orientations of one or more containers of a layer of containers, a controller may determine one or more offsets or deviations of one or more containers of a layer of containers, such as translations of containers from expected or desired positions, and/or rotations of containers from expected or desired orientations. Further, based on the determined offsets or deviations of one or more containers of a layer of containers, a controller may determine an approximate center point and/or an outer bounding box for the layer of containers, in order to thereby determine a desired position and orientation of the container gripping apparatus 100 in order to align and grip the layer of containers.

Figure 3A:
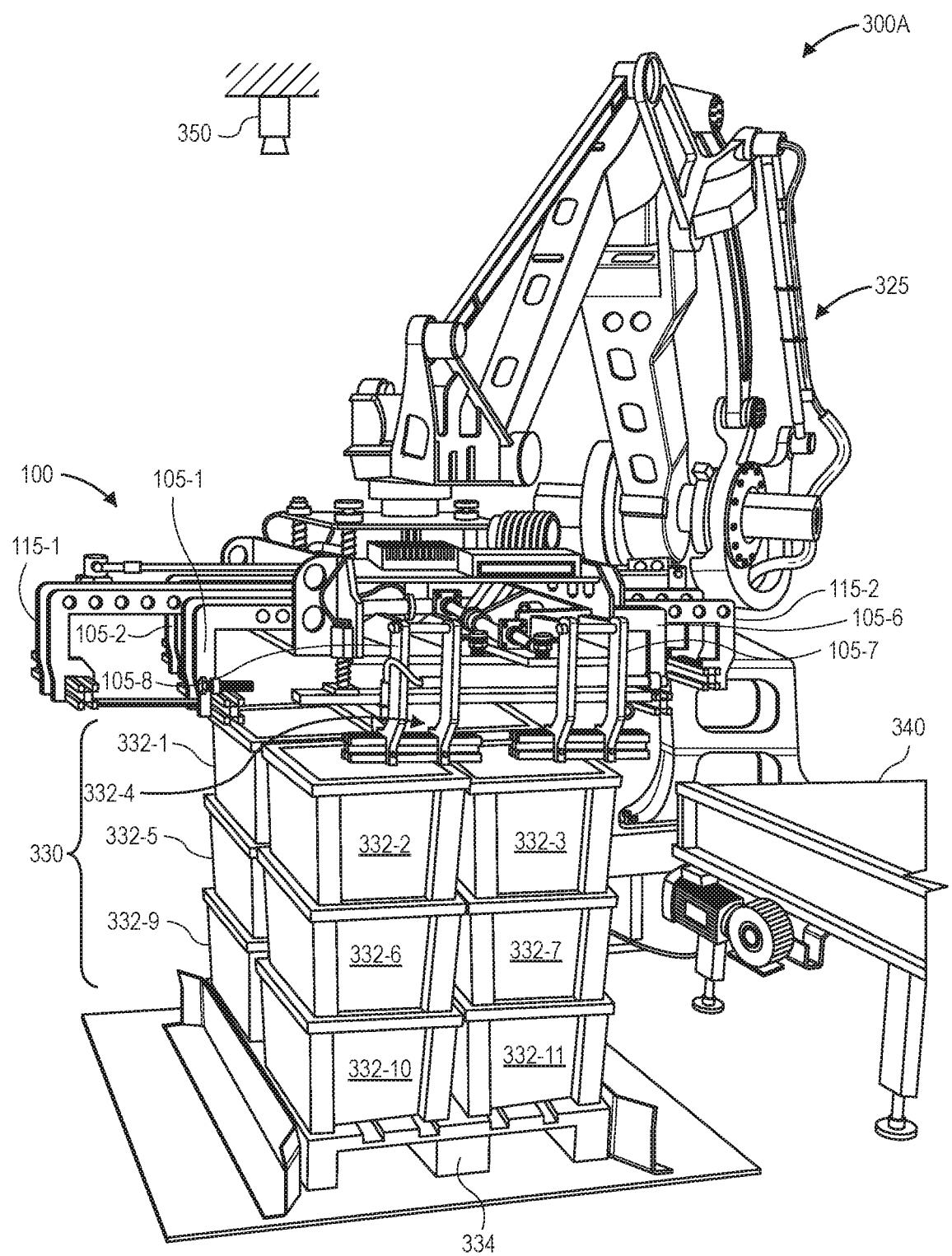
FIGS. 3A-3G are schematic diagrams of an example container gripping tool operation process, in accordance with implementations of the present disclosure.

As shown in FIG. 3A, the controller may instruct the robotic arm 325 to position the container gripping apparatus 100 at a desired position and orientation over a stack 330 of containers 332, e.g., based on imaging data received from a vision system 150, 350 and processing of the imaging data by a controller to detect edges, lines, or other features of one or more containers, to determine offsets or deviations of the one or more containers, and/or to determine an approximate center point and/or outer bounding box of the one or more containers. In addition, the controller may instruct each of the plurality of arm assemblies and the plurality of fork assemblies to be moved or placed in respective extended positions, such that the arm assemblies are separated from or maintain clearance to side surfaces and/or undersides of outer structural ribs or edges of the one or more containers, and the fork assemblies are also removed or separated from or maintain clearance to undersides of inner structural ribs or edges of the one or more containers.

Figure 3B:
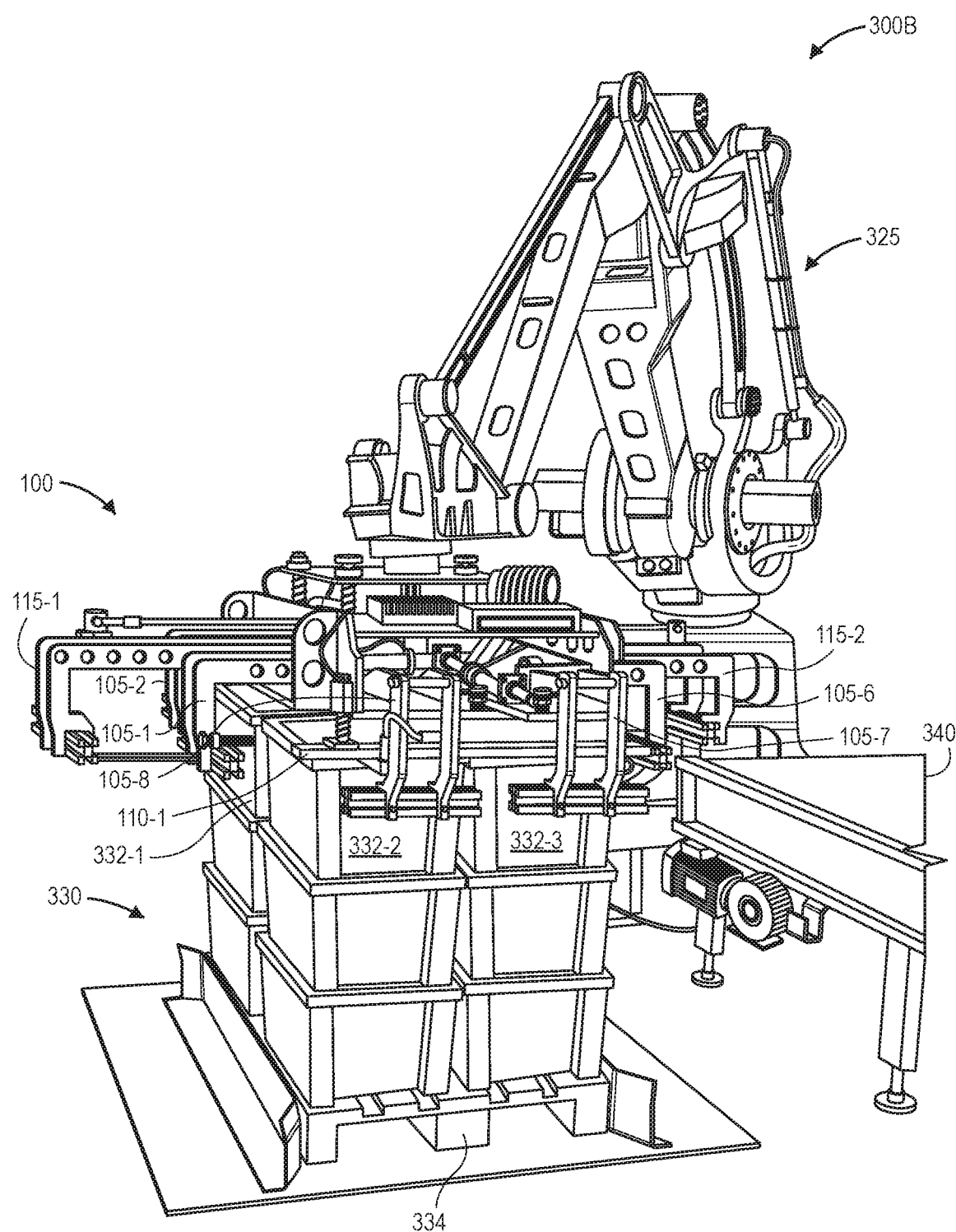

Then, as shown in FIG. 3B, the controller may instruct the robotic arm 325 to lower the container gripping apparatus 100 from the desired position and orientation over the stack 330 of containers 332 onto the upper layer of containers 332-1, 332-2, 332-3, 332-4. In some example embodiments, the movement of the robotic arm 325 to lower the container gripping apparatus 100 may be based on sensor data received from one or more sensors associated with the support plate and/or upper support arms of the container gripping apparatus 100. For example, if the controller determines that the robotic arm 325 and/or the container gripping apparatus 100 are misaligned with the layer of containers, e.g., misaligned with a plane associated with upper edges or surfaces of the layer of containers, and/or that excessive force or pressure is applied to one or more portions of the layer of containers, based on sensor data from the one or more sensors associated with the support plate and/or upper support arms, the controller may instruct the robotic arm 325 to raise, reposition, reorient, and/or realign the container gripping apparatus 100 with the layer of containers.

Figure 3C:
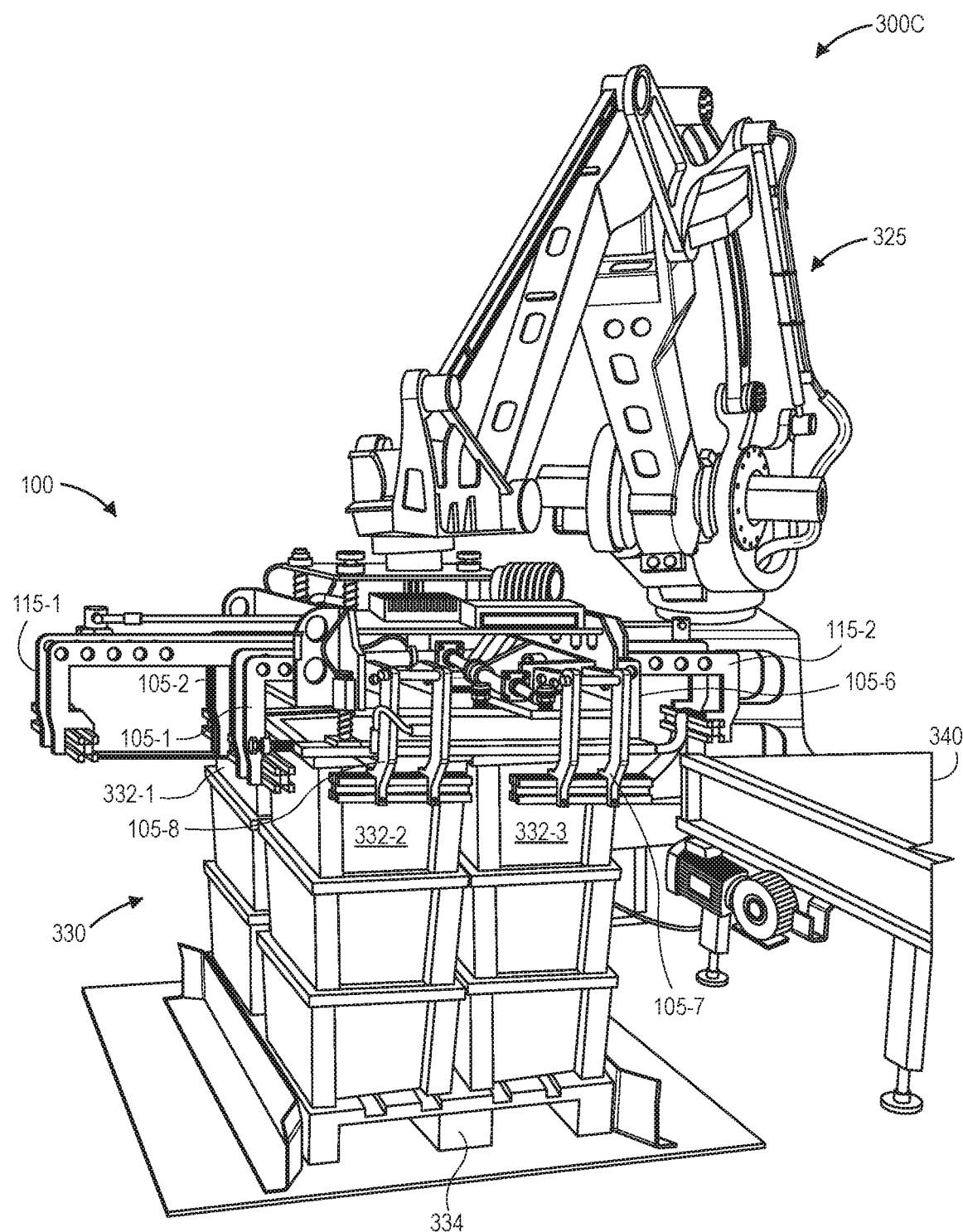

As shown in FIG. 3C, after the robotic arm 325 has lowered the container gripping apparatus 100 onto the layer of containers, the controller may instruct each of the plurality of arm assemblies to move to respective retracted positions, such that the arm assemblies contact or grip side surfaces and/or undersides of outer structural ribs or edges of the one or more containers. In addition, during movement of the plurality of arm assemblies from respective extended positions to respective retracted positions, one or more containers of the layer of containers may be aligned with each other and with the container gripping apparatus, e.g., by modifying respective positions and/or orientations of the one or more containers. In some example embodiments, the movement of the plurality of arm assemblies to respective retracted positions may be based on sensor data received from one or more sensors associated with the arm assemblies of the container gripping apparatus 100. For example, if the controller determines that the arm assemblies are misaligned with the layer of containers, e.g., misaligned with side surfaces and/or undersides of outer structural ribs or edges of the layer of containers, and/or that excessive force or pressure is applied by one or more arm assemblies responsive to moving to respective retracted positions, based on sensor data from the one or more sensors associated with the arm assemblies, the controller may instruct the arm assemblies to return to respective extended positions and retry the movement to respective retracted positions and alignment of the layer of containers, and/or may instruct the robotic arm 325 to raise, reposition, reorient, and/or realign the container gripping apparatus 100 with the layer of containers.

Figure 3D:
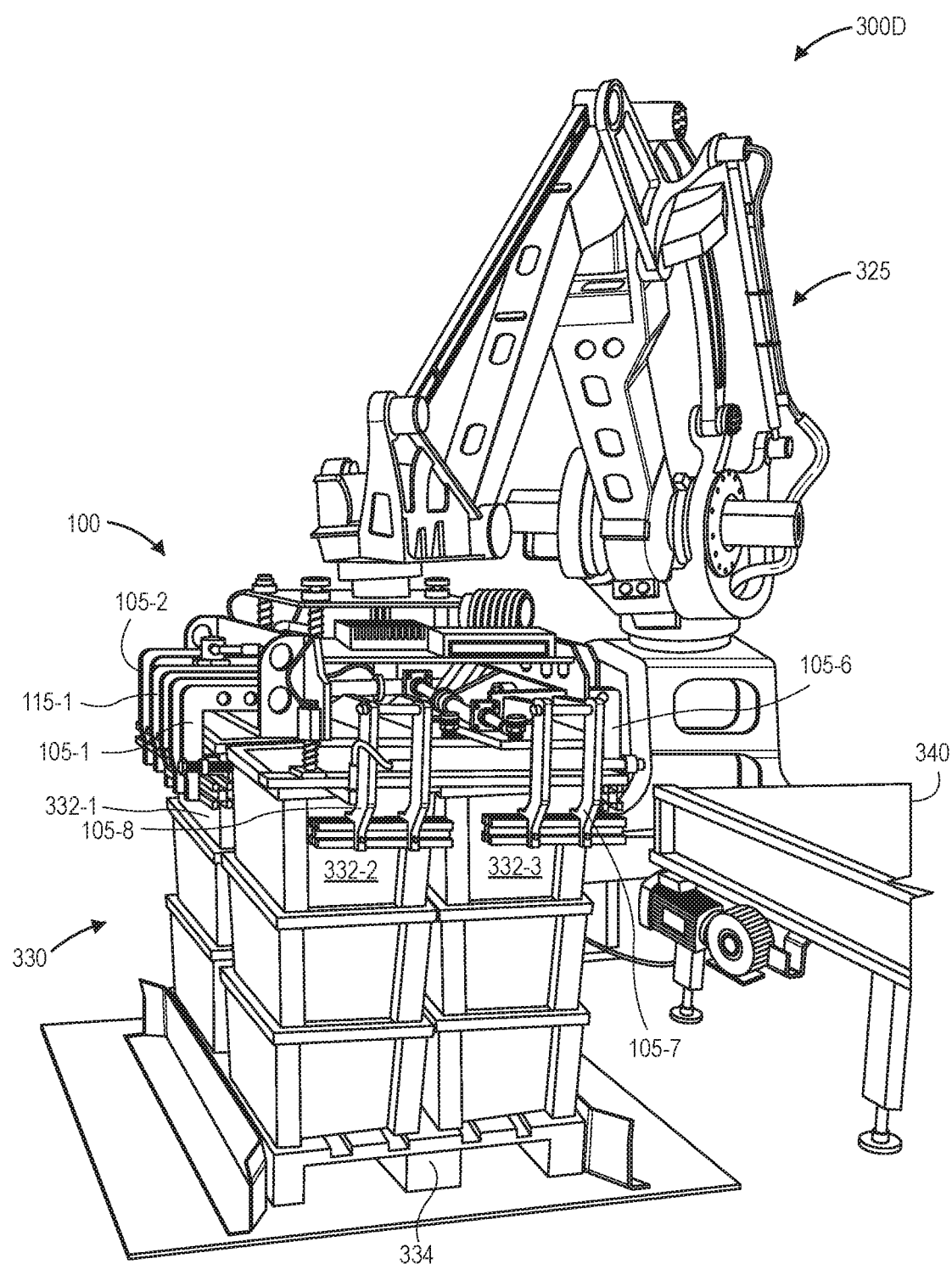

As shown in FIG. 3D, after the arm assemblies have moved to respective retracted positions to contact, align, or grip side surfaces and/or undersides of outer structural ribs or edges of one or more containers of the layer of containers, the controller may instruct each of the plurality of fork assemblies to move to respective retracted positions, such that the fork assemblies contact or support undersides of inner structural ribs or edges of the one or more containers. In some example embodiments, the movement of the plurality of fork assemblies to respective retracted positions may be based on sensor data received from one or more sensors associated with the fork assemblies of the container gripping apparatus 100. For example, if the controller determines that the fork assemblies are misaligned with the layer of containers, e.g., misaligned with undersides of inner structural ribs or edges of the layer of containers, and/or that excessive force or pressure is applied by one or more fork assemblies responsive to moving to respective retracted positions, based on sensor data from the one or more sensors associated with the fork assemblies, the controller may instruct the fork assemblies to return to respective extended positions and retry the movement to respective retracted positions, may instruct the arm assemblies to return to respective extended positions and retry the movement to respective retracted positions and alignment of the layer of containers, and/or may instruct the robotic arm 325 to raise, reposition, reorient, and/or realign the container gripping apparatus 100 with the layer of containers.

Figure 3E:
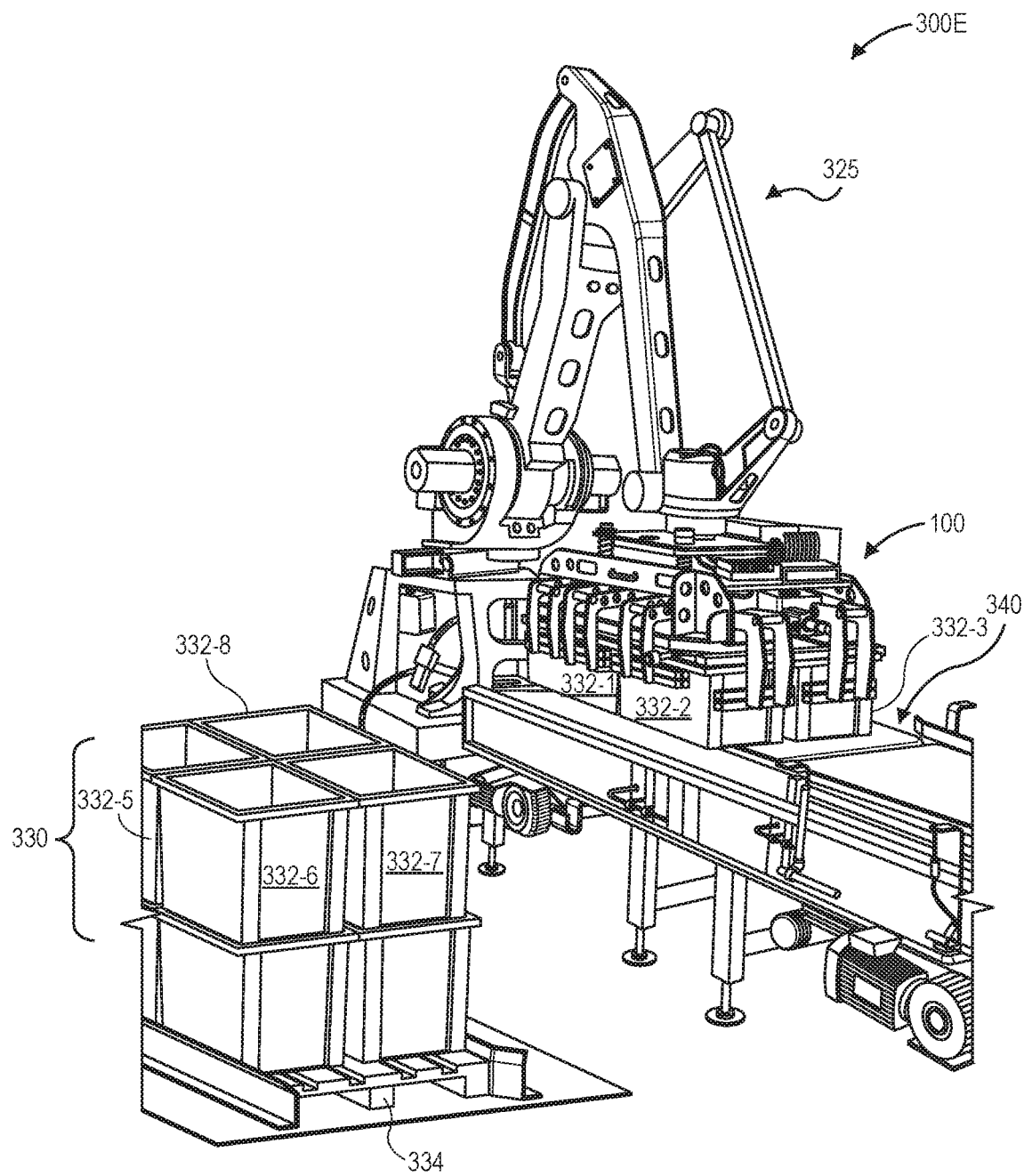

As shown in FIG. 3E, after the fork assemblies have moved to respective retracted positions to contact or grip undersides of inner structural ribs or edges of one or more containers of the layer of containers, the controller may instruct the robotic arm 325 to lift, transfer, move, and lower the layer of containers to a downstream station or process, such as conveyor 340. For example, the controller may instruct the robotic arm 325 to move to a position and orientation over the conveyor 340, e.g., based on imaging data from a vision system 150, 350 and processing of the imaging data by a controller to detect edges, lines, or other features of the conveyor, and/or to determine an approximate center point and/or outer bounding box of the conveyor.

Figure 3F:
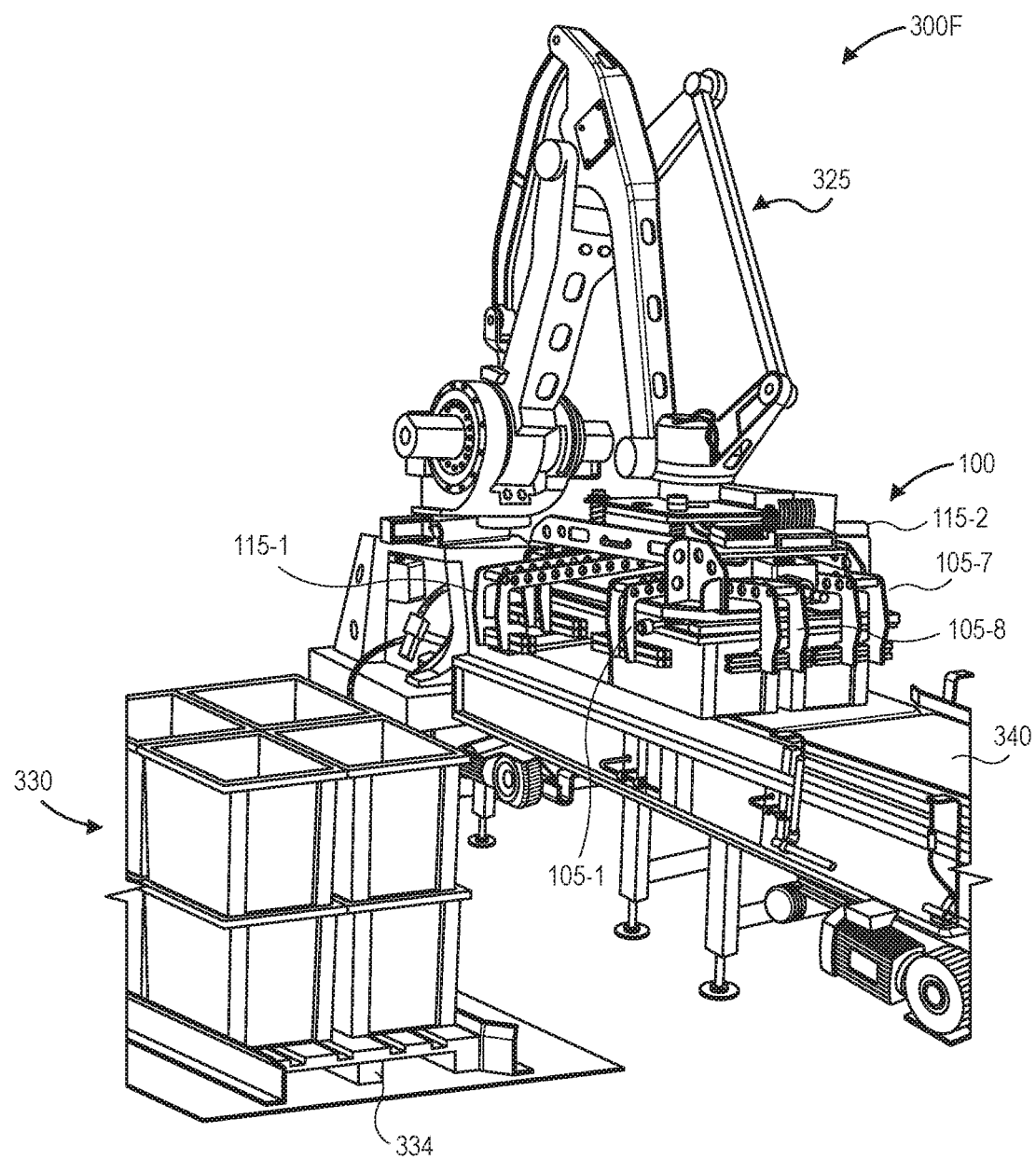

As shown in FIG. 3F, after the robotic arm 325 has lifted, transferred, moved, and lowered the layer of containers to a downstream station or process, such as conveyor 340, the controller may instruct each of the plurality of fork assemblies to move to respective extended positions, such that the fork assemblies are removed or separated from undersides of inner structural ribs or edges of the one or more containers, and may instruct each of the plurality of arm assemblies to move to respective extended positions, such that the arm assemblies are separated from side surfaces and/or undersides of outer structural ribs or edges of the one or more containers. In this manner, each of the plurality of arm assemblies and the plurality of fork assemblies may generate or maintain clearance to respective side surfaces, outer structural ribs or edges, and/or inner structural ribs or edges of a layer of containers such that the container gripping apparatus may be raised or lifted away from the containers.

Figure 3G:
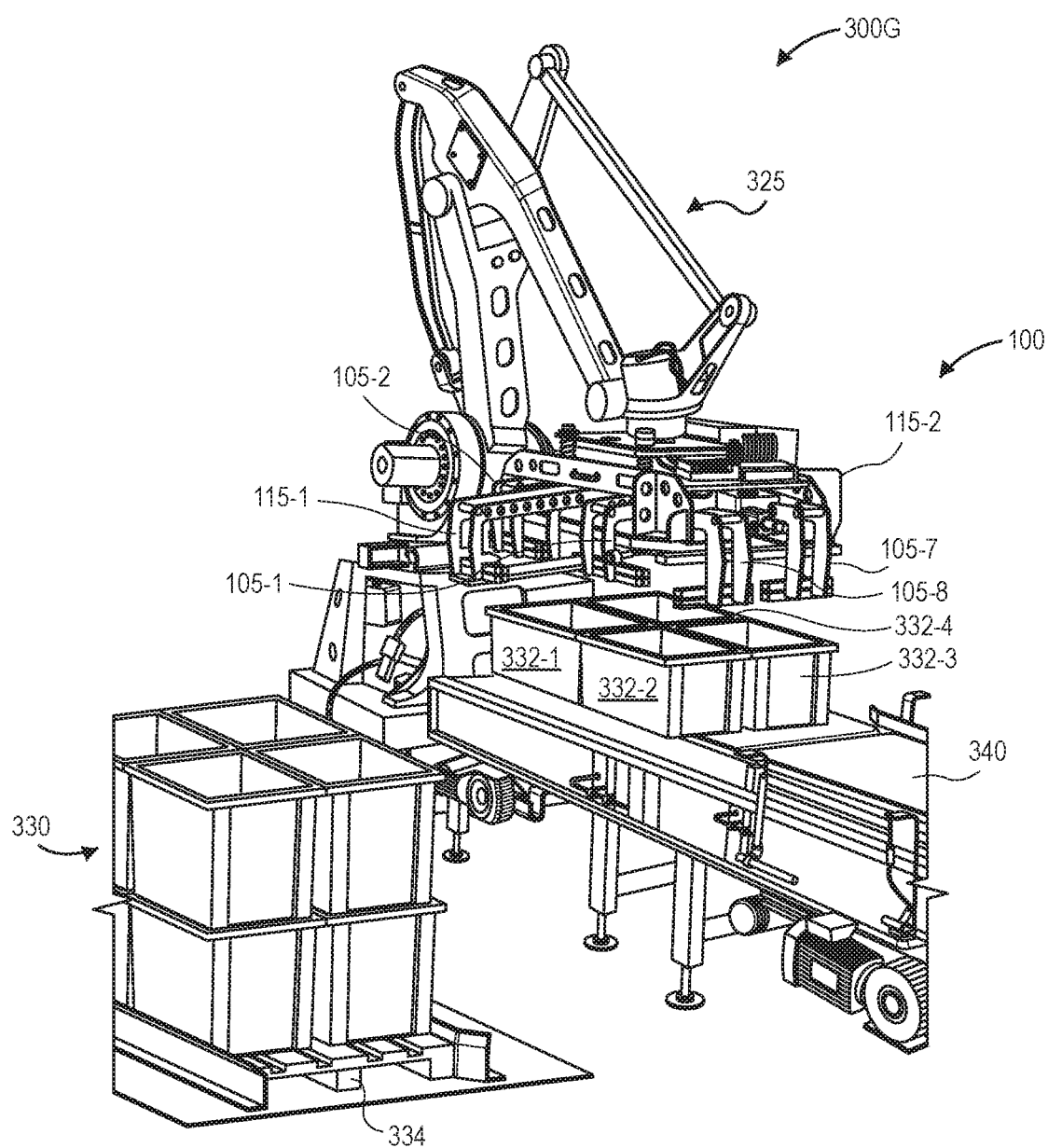

As shown in FIG. 3G, after each of the plurality of arm assemblies and the plurality of fork assemblies have moved to respective extended positions, the controller may instruct the robotic arm 325 to raise or lift the container gripping apparatus 100 away from the one or more containers of the layer of containers. In this manner, the container gripping apparatus 100 may be completely separated, via movement or manipulation of the robotic arm 325, from the layer of containers. In example embodiments in which the layer of containers are placed at a conveyor 340, as shown in FIG. 3G, the layer of containers may then move to a downstream station or process. In addition, various other operations or processes, such as singulation, routing, and/or sorting of individual containers of the layer of containers may be performed, and the individual containers may move to various different downstream stations or processes for further processing in the material handling facility.

Accordingly, using the container gripping apparatus or system as described herein, layers or groups of containers may be quickly, efficiently, and reliably aligned, gripped, lifted, transferred, and released between various locations to facilitate various processing operations, such as receipt, sorting, storage, packing, shipping, or other processing associated with containers, and objects contained therein, within material handling facilities.

Figure 4A:
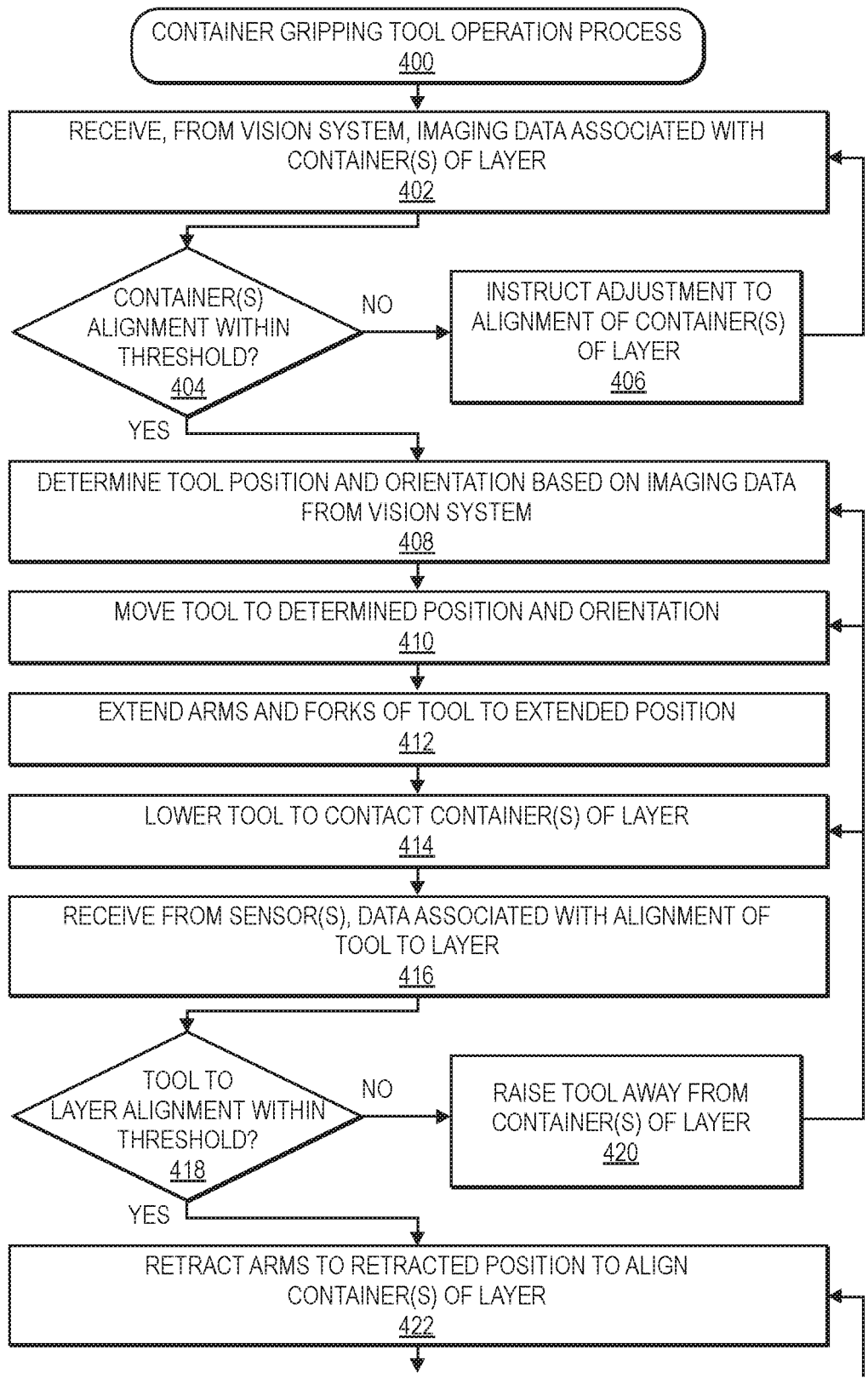
FIGS. 4A-4B are a flow diagram illustrating an example container gripping tool operation process, in accordance with implementations of the present disclosure.
Figure 4B:
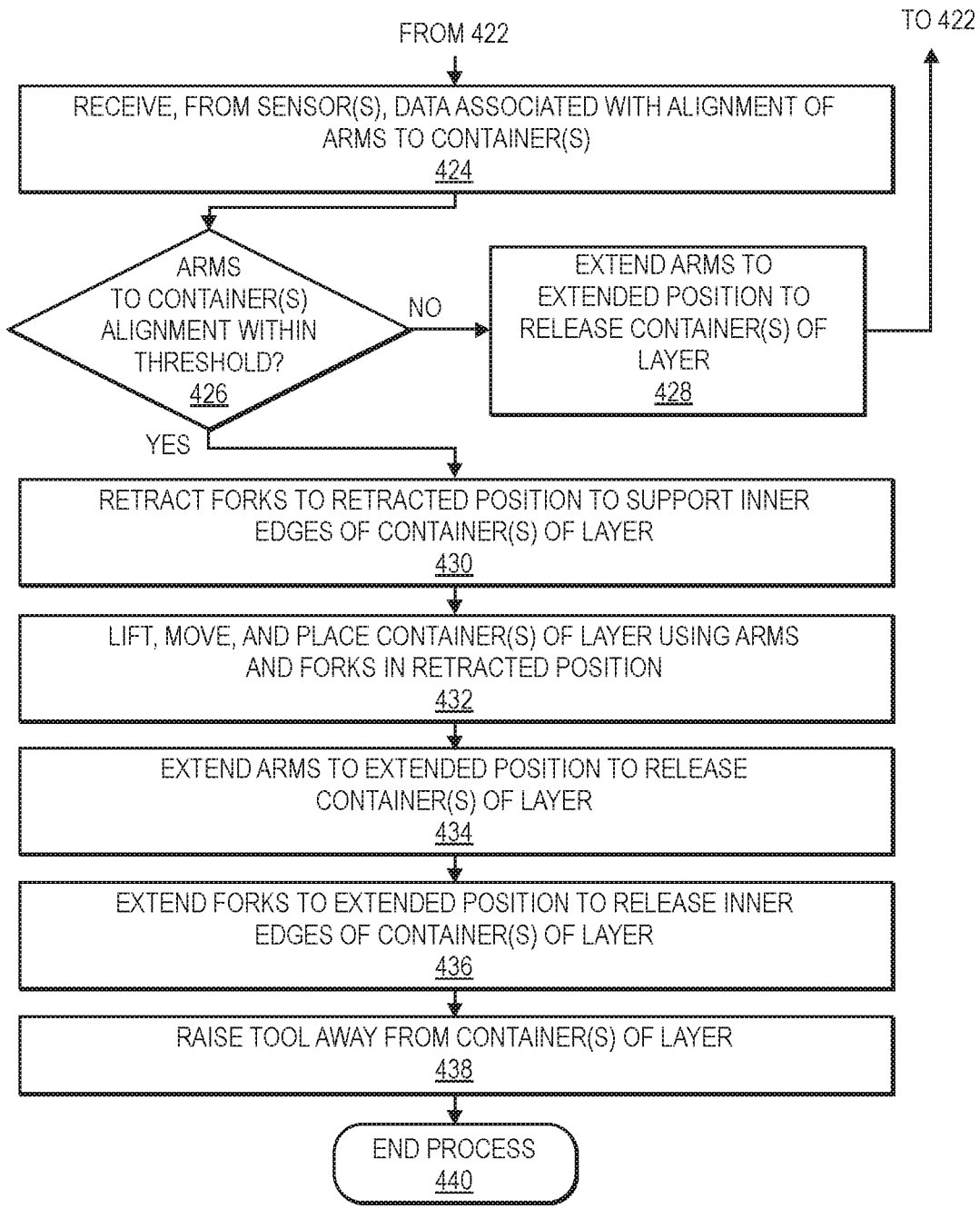

FIGS. 4A-4B are a flow diagram illustrating an example container gripping tool operation process 400, in accordance with implementations of the present disclosure.

The process 400 may begin by receiving, from a vision system, imaging data associated with container(s) of a layer, as at 402. For example, an imaging device or sensor may capture imaging data of one or more containers of a layer of containers, e.g., an upper layer of a stack of containers. In addition, a controller may receive and process the imaging data, e.g., using various image processing techniques or algorithms, to detect edges, lines, surfaces, or other features within the imaging data, determine offsets or deviations of the containers of the layer relative to expected or desired positions and/or orientations of the containers, and/or determine an approximate center point and/or an outer bounding box of the containers.

The process 400 may continue by determining whether the container(s) alignment is within a threshold, as at 404. For example, a container gripping apparatus may be sized or configured to correct misalignments of individual containers of up to approximately 50 mm, or other threshold values. In addition, the container gripping apparatus may have a maximum overall size or span, which may be compared with an approximate center point and/or outer bounding box determined for the containers to determine whether the apparatus is capable of lowering onto, aligning, and gripping the containers of the layer. Further, a controller may compare determined offsets or deviations of containers, and/or an approximate center point or outer bounding box of the containers, with various threshold values related to container offsets or deviations and/or a maximum size, dimensions, or configuration of the container gripping apparatus to determine whether the apparatus is capable of aligning and gripping the containers of the layer.

If it is determined that the container(s) alignment is not within a threshold, then the process 400 may proceed by instructing adjustment to alignment of container(s) of the layer, as at 406. For example, a controller may instruct one or more agents, which may be human, partially manual, partially automated, robotic, and/or fully automated, to reduce, correct, or modify offsets or deviations of one or more containers of the layer, and/or to reduce, correct, or modify an approximate center point and/or outer bounding box of the containers of the layer.

If, however, it is determined that the container(s) alignment is within a threshold, then the process 400 may continue to determine a tool position and/or orientation based on imaging data from the vision system, as at 408. For example, a controller may determine a desired position and/or orientation of the container gripping apparatus in order to align, grip, lift, and transfer the one or more containers of the layer based on the determined offsets or deviations of containers of the layer, and/or based on an approximate center point and/or outer bounding box of the containers of the layer. In example embodiments, the desired position and/or orientation may be aligned over the layer of containers such that a movement device may lower the container gripping apparatus onto the layer of containers without interference between any of the arm assemblies or fork assemblies and the layer of containers.

The process 400 may then proceed to move the tool to the determined position and/or orientation, as at 410. For example, a controller may instruct a movement device, such as a robotic arm coupled to the container gripping apparatus, to move and/or orient the apparatus at the determined position and/or orientation. In example embodiments, the robotic arm may position and orient the container gripping apparatus over the layer of containers such that the apparatus may subsequently be lowered onto, align, and grip the layer of containers.

The process 400 may then continue with extending the arms and forks of the tool to the extended position, as at 412. For example, a controller may instruct each of the plurality of arm assemblies to move to respective extended positions away from a center point or center line of a frame of the container gripping apparatus, and the controller may also instruct each of the plurality of fork assemblies to move to respective extended positions away from a center point or center line of a frame of the container gripping apparatus. In example embodiments, the arm assemblies and fork assemblies in respective extended positions may then be positioned over the layer of containers such that the apparatus may subsequently be lowered onto the layer of containers without interference between any of the arm assemblies or fork assemblies and the layer of containers.

The process 400 may then proceed by lowering the tool to contact container(s) of the layer, as at 414. For example, a controller may instruct the robotic arm to lower the container gripping apparatus from the determined position and orientation over the layer of containers, and having arm assemblies and fork assemblies in respective extended positions, onto the layer of containers. In example embodiments, a portion of the frame, and/or one or more upper support bars, of the container gripping apparatus may contact and/or apply a pressure or force to the layer of containers, e.g., to upper edges or surfaces of the layer of containers.

The process 400 may then continue to receive, from sensor(s), data associated with alignment of the tool to the layer, as at 416. For example, one or more sensors associated with the support plate and/or one or more upper support bars of the container gripping apparatus may detect alignment, pressure, or forces between the apparatus and a plane associated with upper edges or surfaces of the layer of containers. In example embodiments, misalignment between the apparatus and the layer of containers may comprise contact between a first portion, corner, or side of the apparatus and a first portion, corner, or side of the layer of containers and lack of contact between a second portion, corner, or side of the apparatus and a second portion, corner, or side of the layer of containers, may comprise different amounts of contact or compression between different portions, corners, or sides of the apparatus and the layer of containers, and/or may comprise different amounts of force or pressure applied to different portions, corners, or sides of the apparatus and the layer of containers. Further, a controller may receive the sensor data from the one or more sensors associated with alignment, pressure, or forces between the apparatus and a plane associated with upper edges or surfaces of the layer of containers.

The process 400 may then proceed to determine whether the tool to layer alignment is within a threshold, as at 418. For example, a controller may receive and process the sensor data to determine whether the different amounts of contact, different amounts of compression, and/or different amounts of applied force or pressure between the apparatus and the layer of containers are within various threshold values related to amounts of contact, amounts of compression, and/or amounts of applied force or pressure. In example embodiments, the various threshold values may be determined in order to ensure safe, level, accurate, and reliable alignment and gripping of the layer of containers by the container gripping apparatus.

If it is determined that the tool to layer alignment is not within a threshold, then the process 400 may continue with raising the tool away from the container(s) of the layer, as at 420. For example, a controller may instruct the robotic arm to raise or lift the container gripping apparatus away from contact with the layer of containers. In example embodiments, a portion of the frame, and/or one or more upper support bars, of the container gripping apparatus may then no longer contact and/or apply a pressure or force to the layer of containers, e.g., to upper edges or surfaces of the layer of containers. Then, the process 400 may return to any of steps 408, 410, and/or 414, to determine a new position and/or orientation for the container gripping apparatus based on sensor data from the one or more sensors, to reposition or reorient the container gripping apparatus at the determined position and/or orientation, and/or to retry lowering the tool to contact the layer of containers.

If, however, it is determined that the tool to layer alignment is within a threshold, then the process 400 may proceed with retracting arms to retracted positions to align container(s) of the layer, as at 422. For example, a controller may instruct each of the plurality of arm assemblies to move to respective retracted positions toward a center point or center line of a frame of the container gripping apparatus. In example embodiments, responsive to sliding the arm assemblies toward respective retracted positions, gripping members of the arm assemblies may contact side surfaces and/or undersides of outer structural ribs or edges of containers of the layer, and may push, move, reorient, and align individual containers of the layer of containers with each other and with the container gripping apparatus, such that the layer of containers may subsequently be lifted and transferred.

The process 400 may then continue by receiving, from sensor(s), data associated with alignment of the arms to the container(s), as at 424. For example, one or more sensors associated with the arm assemblies of the container gripping apparatus may detect alignment, pressure, or forces between the arm assemblies and outer edges, surfaces, or planes associated with the layer of containers. In example embodiments, misalignment between the arm assemblies and the layer of containers may comprise contact between a first portion, corner, or side of a first arm assembly and a first portion, corner, or side of a first container and lack of contact between a second portion, corner, or side of the first arm assembly and a second portion, corner, or side of the first container, may comprise different amounts of contact or compression between different portions, corners, or sides of respective arm assemblies and respective containers, and/or may comprise different amounts of force or pressure applied to different portions, corners, or sides of respective arm assemblies and respective containers. Further, a controller may receive the sensor data from the one or more sensors associated with alignment, pressure, or forces between the arm assemblies and outer edges, surfaces, or planes associated with the layer of containers.

The process 400 may then proceed by determining whether the arms to container(s) alignment is within a threshold, as at 426. For example, a controller may receive and process the sensor data to determine whether the different amounts of contact, different amounts of compression, and/or different amounts of applied force or pressure between the arm assemblies and the containers are within various threshold values related to amounts of contact, amounts of compression, and/or amounts of applied force or pressure. In example embodiments, the various threshold values may be determined in order to ensure safe, level, accurate, and reliable alignment and gripping of the layer of containers by the container gripping apparatus.

If it is determined that the arms to container(s) alignment is not within a threshold, then the process 400 may continue to extend the arms to extended positions to release container(s) of the layer, as at 428. For example, a controller may instruct the container gripping apparatus to extend one or more of the arm assemblies to respective extended positions away from contact with the layer of containers. In example embodiments, a portion of the gripping members of one or more arm assemblies of the container gripping apparatus may then no longer contact and/or apply a pressure or force to the layer of containers, e.g., to side surfaces and/or outer structural ribs or edges of the layer of containers. Then, the process 400 may return to step 422 to retry retracting the arms to retracted positions to align container(s) of the layer.

If, however, it is determined that the arms to container(s) alignment is within a threshold, then the process 400 may proceed to retract forks to retracted positions to support inner edges of container(s) of the layer, as at 430. For example, a controller may instruct each of the plurality of fork assemblies to move to respective retracted positions toward a center point or center line of a frame of the container gripping apparatus. In example embodiments, responsive to sliding the fork assemblies toward respective retracted positions, gripping forks of the fork assemblies may be inserted into gaps between side surfaces of adjacent containers and/or may contact undersides of inner structural ribs or edges of one or more adjacent containers of the layer, such that the layer of containers may subsequently be lifted and transferred.

In additional example embodiments, the process 400 may also receive, from sensor(s), data associated with alignment of the forks to the container(s), similar to step 424 described above. For example, one or more sensors associated with the fork assemblies of the container gripping apparatus may detect alignment, pressure, or forces between the fork assemblies and inner edges, surfaces, or planes associated with the layer of containers. In example embodiments, misalignment between the fork assemblies and the layer of containers may comprise contact between a first portion, corner, or side of a first fork assembly and a first portion, corner, or side of a first container and lack of contact between a second portion, corner, or side of the first fork assembly and a second portion, corner, or side of the first container, may comprise different amounts of contact or compression between different portions, corners, or sides of respective fork assemblies and respective containers, and/or may comprise different amounts of force or pressure applied to different portions, corners, or sides of respective fork assemblies and respective containers. Further, a controller may receive the sensor data from the one or more sensors associated with alignment, pressure, or forces between the fork assemblies and inner edges, surfaces, or planes associated with the layer of containers.

In additional example embodiments, the process 400 may also determine whether the forks to container(s) alignment is within a threshold, similar to step 426 described above. For example, a controller may receive and process the sensor data to determine whether the different amounts of contact, different amounts of compression, and/or different amounts of applied force or pressure between the fork assemblies and the containers are within various threshold values related to amounts of contact, amounts of compression, and/or amounts of applied force or pressure. In example embodiments, the various threshold values may be determined in order to ensure safe, level, accurate, and reliable alignment and gripping of the layer of containers by the container gripping apparatus. If it is determined that the forks to container(s) alignment is not within a threshold, in additional example embodiments, the process 400 may also extend the forks to extended positions to release container(s) of the layer, similar to step 428 described above. For example, a controller may instruct the container gripping apparatus to extend one or more of the fork assemblies to respective extended positions away from contact with the layer of containers. In example embodiments, a portion of the forks of one or more fork assemblies of the container gripping apparatus may then no longer contact and/or apply a pressure or force to the layer of containers, e.g., to inner structural ribs or edges of the layer of containers. In additional example embodiments, the process 400 may return to step 430 to retry retracting the forks to retracted positions to align container(s) of the layer.

The process 400 may then continue with lifting, moving, and placing the container(s) of the layer using arms and forks in the retracted positions, as at 432. For example, a controller may instruct the robotic arm to lift, move, manipulate, orient, and/or place the layer of containers that have been aligned and gripped using the arm assemblies and the fork assemblies of the container gripping apparatus. In example embodiments, the robotic arm may move, reposition, and reorient the layer of containers in various manners limited only by the operational or functional capabilities of the robotic arm, and may also generally maintain the layer of containers substantially level and may move the layer of containers with reduced or minimal acceleration, in order to prevent movement, damage, loss, or other detrimental effects to the containers, and one or more objects contained therein. In some example embodiments, movement and placement of the layer of containers at a downstream station or process by the robotic arm and container gripping apparatus may also be based on imaging data received from an imaging device or sensor that indicates a desired position or orientation of the layer of containers at the downstream station or process. For example, the controller may receive and process the imaging data to determine edges, lines, surfaces, or other features associated with a placement location, an approximate center point and/or outer bounding box associated with the placement location, and/or a determined position and/or orientation for the robotic arm and/or container gripping apparatus in order to place the layer of containers at the placement location.

After placing the layer of containers at a destination location by the robotic arm and container gripping apparatus, such as a downstream station or process, the process 400 may proceed with extending arms to extended positions to release container(s) of the layer, as at 434. For example, a controller may instruct each of the plurality of arm assemblies to move to respective extended positions away from a center point or center line of a frame of the container gripping apparatus. In example embodiments, responsive to sliding the arm assemblies toward respective extended positions, gripping members of the arm assemblies may no longer contact side surfaces and/or undersides of outer structural ribs or edges of containers of the layer, such that the layer of containers may subsequently be moved or transferred to one or more downstream stations or processes, e.g., using various material handling equipment or apparatus.

Further, the process 400 may continue by extending forks to extended positions to release inner edges of container(s) of the layer, as at 436. For example, a controller may instruct each of the plurality of fork assemblies to move to respective extended positions away from a center point or center line of a frame of the container gripping apparatus. In example embodiments, responsive to sliding the fork assemblies toward respective extended positions, gripping forks of the fork assemblies may be removed from gaps between side surfaces of adjacent containers and may no longer contact undersides of inner structural ribs or edges of containers of the layer, such that the layer of containers may subsequently be moved or transferred to one or more downstream stations or processes, e.g., using various material handling equipment or apparatus.

The process 400 may then proceed by raising the tool away from the container(s) of the layer, as at 438. For example, a controller may instruct the robotic arm to raise or lift the container gripping apparatus, having arm assemblies and fork assemblies in respective extended positions, from the placement location of the layer of containers at the downstream station or process to a position and orientation separated from and over the layer of containers. In example embodiments, a portion of the frame, and/or one or more upper support bars, of the container gripping apparatus may then no longer contact and/or apply a pressure or force to the layer of containers, e.g., to upper edges or surfaces of the layer of containers. Accordingly, all portions of the container gripping apparatus may generate or maintain a clearance to all portions of the layer of containers, such that the layer of containers, individually or collectively, may subsequently be moved or transferred to one or more downstream stations or processes, e.g., using various material handling equipment or apparatus The process 400 may then end, as at 440. Further, the process 400 may be repeated any number of times to continue to align, lift, transfer, and place additional layers of containers between the stack of containers and downstream stations or processes, and/or to align, lift, transfer, and place other layers of containers between various other locations, including stacks of containers, upstream stations or processes, and/or downstream stations or processes.

Figure 5:
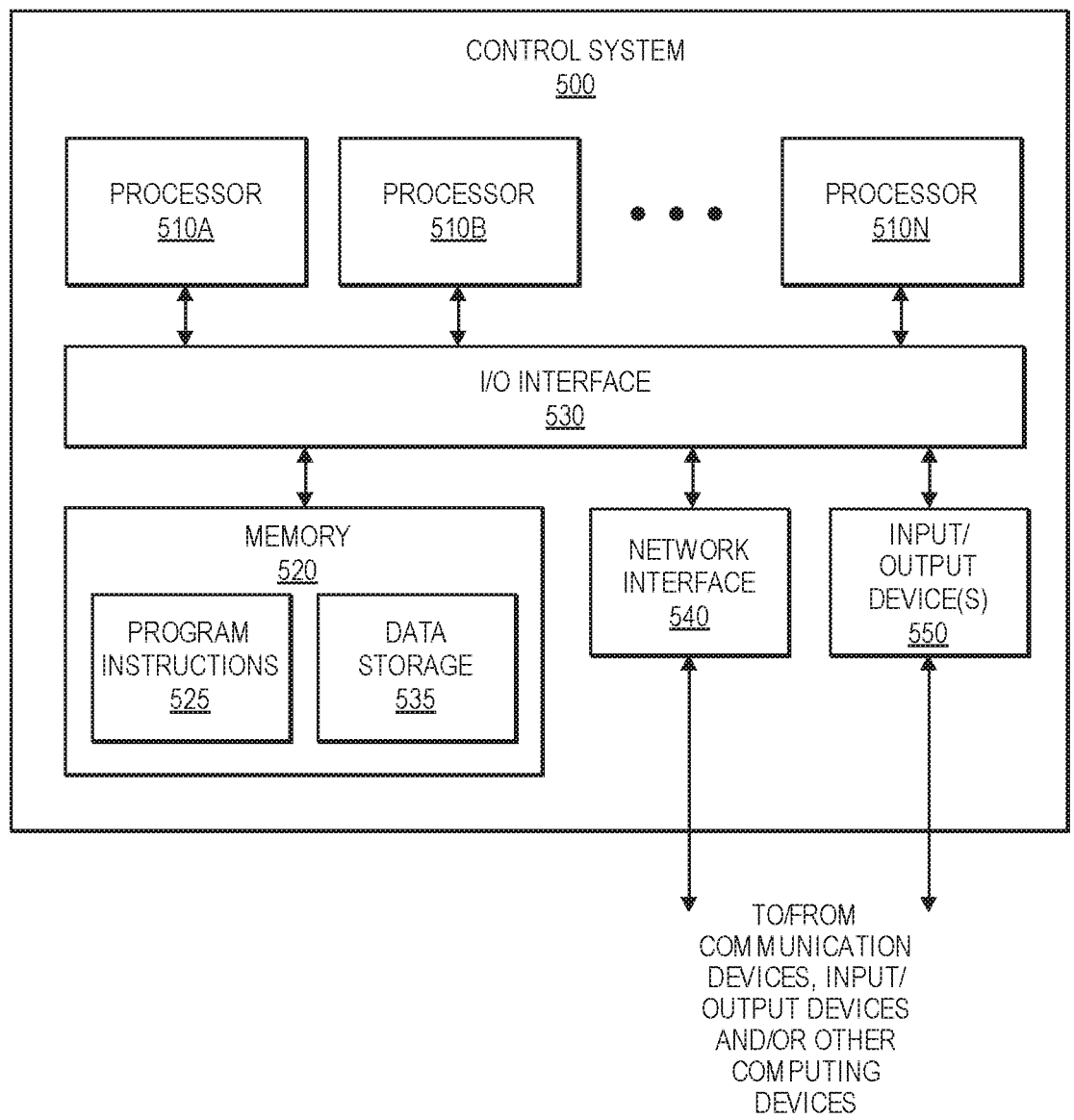
FIG. 5 is a block diagram illustrating an example control system, in accordance with implementations of the present disclosure.

FIG. 5 is a block diagram illustrating an example control system 500, in accordance with implementations of the present disclosure.

Various operations of a control system or controller, such as those described herein, may be executed on one or more computer systems, and/or interacting with various other computers, systems, or devices in a material handling facility, according to various implementations. For example, the control system or controller discussed above may function and operate on one or more computer systems. One such control system is illustrated by the block diagram in FIG. 5. In the illustrated implementation, a control system 500 includes one or more processors 510A, 510B through 510N, coupled to a non-transitory computer-readable storage medium 520 via an input/output (I/O) interface 530. The control system 500 further includes a network interface 540 coupled to the I/O interface 530, and one or more input/output devices 550. In some implementations, it is contemplated that a described implementation may be implemented using a single instance of the control system 500 while, in other implementations, multiple such systems or multiple nodes making up the control system 500 may be configured to host different portions or instances of the described implementations. For example, in one implementation, some data sources or services (e.g., related to portions of container gripping and manipulation systems, operations, or processes, etc.) may be implemented via one or more nodes of the control system 500 that are distinct from those nodes implementing other data sources or services (e.g., related to other portions of container gripping and manipulation systems, operations, or processes, etc.).

In various implementations, the control system 500 may be a uniprocessor system including one processor 510A, or a multiprocessor system including several processors 510A-510N (e.g., two, four, eight, or another suitable number). The processors 510A-510N may be any suitable processor capable of executing instructions. For example, in various implementations, the processors 510A-510N may be general-purpose or embedded processors implementing any of a variety of instruction set architectures (ISAs), such as the x86, PowerPC, SPARC, or MIPS ISAs, or any other suitable ISA. In multiprocessor systems, each of the processors 510A-510N may commonly, but not necessarily, implement the same ISA.

The non-transitory computer-readable storage medium 520 may be configured to store executable instructions and/or data accessible by the one or more processors 510A-510N. In various implementations, the non-transitory computer-readable storage medium 520 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 520 as program instructions 525 and data storage 535, respectively. In other implementations, program instructions and/or data may be received, sent or stored upon different types of computer-accessible media, such as non-transitory media, or on similar media separate from the non-transitory computer-readable storage medium 520 or the control system 500. Generally speaking, a non-transitory, computer-readable storage medium may include storage media or memory media such as magnetic or optical media, e.g., disk or CD/DVD-ROM, coupled to the control system 500 via the I/O interface 530. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 540.

In one implementation, the I/O interface 530 may be configured to coordinate I/O traffic between the processors 510A-510N, the non-transitory computer-readable storage medium 520, and any peripheral devices, including the network interface 540 or other peripheral interfaces, such as input/output devices 550. In some implementations, the I/O interface 530 may perform any necessary protocol, timing or other data transformations to convert data signals from one component (e.g., non-transitory computer-readable storage medium 520) into a format suitable for use by another component (e.g., processors 510A-510N). In some implementations, the I/O interface 530 may include support for devices attached through various types of peripheral buses, such as a variant of the Peripheral Component Interconnect (PCI) bus standard or the Universal Serial Bus (USB) standard, for example. In some implementations, the function of the I/O interface 530 may be split into two or more separate components, such as a north bridge and a south bridge, for example. Also, in some implementations, some or all of the functionality of the I/O interface 530, such as an interface to the non-transitory computer-readable storage medium 520, may be incorporated directly into the processors 510A-510N.

The network interface 540 may be configured to allow data to be exchanged between the control system 500 and other devices attached to a network, such as other control systems, material handling system controllers, warehouse management systems, other computer systems, robotic arms, machines, or systems, container gripping apparatus, machines, or systems (and components thereof), various types of actuators, various types of sensors, various types of vision systems, imaging devices, or imaging sensors, upstream stations or processes, downstream stations or processes, other material handling systems or equipment, or between nodes of the control system 500. In various implementations, the network interface 540 may support communication via wired or wireless general data networks, such as any suitable type of Ethernet network.

Input/output devices 550 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 500. Multiple input/output devices 550 may be present in the control system 500 or may be distributed on various nodes of the control system 500. In some implementations, similar input/output devices may be separate from the control system 500 and may interact with one or more nodes of the control system 500 through a wired or wireless connection, such as over the network interface 540.

As shown in FIG. 5, the memory 520 may include program instructions 525 that may be configured to implement one or more of the described implementations and/or provide data storage 535, which may comprise various tables, data stores and/or other data structures accessible by the program instructions 525. The program instructions 525 may include various executable instructions, programs, or applications to facilitate container gripping and manipulation operations and processes described herein, such as movement device or robotic arm, machine, or apparatus controllers, drivers, or applications, container gripping apparatus controllers, drivers, or applications, actuator controllers, drivers, or applications, sensor controllers, drivers, or applications, sensor data processing applications, vision system or imaging device controllers, drivers, or applications, imaging data processing applications, material handling equipment controllers, drivers, or applications, upstream station controllers, drivers, or applications, downstream station controllers, drivers, or applications, etc. The data storage 535 may include various data stores for maintaining data related to systems, operations, or processes described herein, such as container gripping apparatus or systems, movement devices such as robotic arms, machines, or apparatus, actuators, sensors, sensor data, vision systems or imaging devices, imaging data, containers, container data, items or objects, item or object data, material handling equipment or apparatus, upstream systems, stations, or processes, downstream systems, stations, or processes, etc.

Those skilled in the art will appreciate that the control system 500 is merely illustrative and is not intended to limit the scope of implementations. In particular, the control system and devices may include any combination of hardware or software that can perform the indicated functions, including computers, network devices, internet appliances, robotic devices, etc. The control system 500 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4A-4B, orders in which such methods or processes are presented are not intended to be construed as any limitation on the claimed inventions, and any number of the method or process steps or boxes described herein can be omitted, reordered, and/or combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A container gripping system, comprising:
   a frame;
   a support plate coupled to the frame, the support plate configured to couple the container gripping system with a robotic arm;
   a plurality of container gripping arm assemblies arranged around the frame, each container gripping arm assembly including:
      a support arm configured to slide relative to the frame;
      a gripping member coupled to the support arm, the gripping member configured to move within a first horizontal plane relative to the frame; and
      an actuator configured to slide the support arm relative to the frame between a retracted position and an extended position;
      wherein the gripping member contacts a side surface of a container in the retracted position; and
      wherein the gripping member is separated from the side surface of the container in the extended position; and
   two container gripping fork assemblies arranged on opposite sides of the frame, each container gripping fork assembly including:
      a support member configured to slide relative to the frame;
      a gripping fork coupled to the support member, the gripping fork configured to move approximately within the first horizontal plane relative to the frame; and
      an actuator configured to slide the support member relative to the frame between a retracted position and an extended position;
      wherein the gripping fork contacts an underside of an inner rib or edge of a container in the retracted position; and
      wherein the gripping fork is separated from the underside of the inner rib or edge of the container in the extended position.

2. The container gripping system of claim 1, wherein the frame comprises a rectangular frame having four sides;
   wherein the plurality of container gripping arm assemblies comprises eight container gripping arm assemblies; and
   wherein two container gripping arm assemblies are arranged on each of the four sides of the rectangular frame.

3. The container gripping system of claim 2, wherein each container gripping fork assembly is positioned on a long side of the rectangular frame and between respective two container gripping arm assemblies arranged on the long side.

4. The container gripping system of claim 3, wherein the gripping fork of each container gripping fork assembly is configured to be inserted between adjacent containers to be gripped by the container gripping system.

5. An apparatus, comprising:
   a frame;
   a support plate coupled to the frame, the support plate configured to couple the apparatus with a movement device;
   a plurality of arm assemblies arranged around the frame, at least one arm assembly arranged on each side of the frame, each arm assembly including:
      a support arm configured to slide relative to the frame between a retracted position and an extended position; and
      a gripping member coupled to the support arm, the gripping member configured to move within a first horizontal plane relative to the frame;
      wherein the gripping member contacts a side surface of a container in the retracted position; and
   at least one fork assembly arranged on a side of the frame, the at least one fork assembly including:
      a support member configured to slide relative to the frame between a retracted position and an extended position; and
      a gripping fork coupled to the support member, the gripping fork configured to move approximately within the first horizontal plane relative to the frame;
      wherein the gripping fork contacts an underside of an inner rib or edge of a container in the retracted position.

6. The apparatus of claim 5, wherein each arm assembly further includes an actuator configured to slide the support arm relative to the frame between the retracted position and the extended position; and wherein the at least one fork assembly further includes an actuator configured to slide the support member relative to the frame between the retracted position and the extended position.

7. The apparatus of claim 5, wherein the plurality of arm assemblies are configured to correct misalignment of containers responsive to sliding the support arms and the gripping members from the extended position to the retracted position.

8. The apparatus of claim 5, where each arm assembly further includes a compliant material coupled to the gripping member;
  wherein the gripping member contacts, via the compliant material, the side surface of the container in the retracted position; and
  wherein the compliant material comprises at least one of rubber, silicone, or plastic.

9. The apparatus of claim 5, wherein each arm assembly further includes a sensor configured to detect a force or pressure between the gripping member and the side surface of the container responsive to sliding the support arm and the gripping member from the extended position to the retracted position.

10. The apparatus of claim 5, wherein the gripping fork is configured to be inserted between side surfaces of adjacent containers to contact undersides of respective inner ribs or edges of the adjacent containers in the retracted position; and
  wherein the at least one fork assembly further includes a sensor configured to detect a force or pressure between the gripping fork and the undersides of respective inner ribs or edges of the adjacent containers responsive to sliding the support member and the gripping fork from the extended position to the retracted position.

11. The apparatus of claim 5, further comprising:
  at least one upper support bar coupled to the frame, the at least one upper support bar configured to contact an upper side of an outer edge of a container.

12. The apparatus of claim 11, wherein the at least one upper support bar further includes a sensor configured to detect misalignment between the apparatus and a plane associated with a layer of containers to be gripped by the apparatus.

13. The apparatus of claim 5, wherein the support plate further includes a sensor configured to detect misalignment between the apparatus and a plane associated with a layer of containers to be gripped by the apparatus.

14. The apparatus of claim 5, further comprising:
  a controller configured to at least:
    instruct the movement device to move the apparatus between a stack of containers and a downstream station;
    cause sliding of the support arm and the gripping member of each arm assembly between the retracted position and the extended position; and
    cause sliding of the support member and the gripping fork of the at least one fork assembly between the retracted position and the extended position.

15. The apparatus of claim 14, further comprising:
  an imaging device configured to capture imaging data of the stack of containers; and
  wherein the controller is further configured to at least:
    determine a position and an orientation of the apparatus relative to the stack of containers to grip a layer of containers based at least in part on the imaging data; and
    instruct the movement device to move the apparatus to the determined position and orientation relative to the stack of containers.

16. A computer-implemented method, comprising:
  instructing, by a controller, a movement device to lower a gripping apparatus onto a stack of containers;
  instructing, by the controller, retraction of a plurality of arm assemblies arranged around a frame of the gripping apparatus to respective retracted positions to contact respective side surfaces of a layer of containers associated with the stack of containers, wherein respective gripping members of the plurality of arm assemblies are configured to move within a first horizontal plane relative to the frame;
  instructing, by the controller, retraction of at least one fork assembly arranged around the frame of the gripping apparatus to a respective retracted position to contact at least one inner rib or edge of the layer of containers associated with the stack of containers, wherein a gripping fork of the at least one fork assembly is configured to move approximately within the first horizontal plane relative to the frame; and
  instructing, by the controller, the movement device to lift and transfer the layer of containers to a downstream station.

17. The computer-implemented method of claim 16, further comprising:
  receiving, by the controller from an imaging device, imaging data associated with the stack of containers;
  determining, by the controller, a position and an orientation of the gripping apparatus over the stack of containers to contact the layer of containers based at least in part on the imaging data; and
  instructing, by the controller, the movement device to move the gripping apparatus to the determined position and orientation over the stack of containers.

18. The computer-implemented method of claim 16, further comprising:
  receiving, by the controller from at least one sensor, data associated with alignment between the gripping apparatus and a plane associated with the layer of containers; and
  determining, by the controller, that the gripping apparatus and the layer of containers are aligned within a threshold value based at least in part on the data from the at least one sensor.

19. The computer-implemented method of claim 16, wherein instructing, by the controller, retraction of the plurality of arm assemblies and the at least one fork assembly to respective retracted positions to contact the layer of containers further comprises:
  instructing retraction of the plurality of arm assemblies prior to instructing retraction of the at least one fork assembly; and
  the method further comprising:
  receiving, by the controller from at least one sensor, data associated with force or pressure between the plurality of arm assemblies and the layer of containers; and
  determining, by the controller, that the plurality of arm assemblies and the layer of containers are aligned within a threshold value based at least in part on the data from the at least one sensor.

20. The computer-implemented method of claim 16, further comprising:
  instructing, by the controller, extension of the plurality of arm assemblies and the at least one fork assembly to respective extended positions to release the layer of containers at the downstream station; and instructing, by the controller, the movement device to raise the gripping apparatus having the plurality of arm assemblies and the at least one fork assembly in respective extended positions up away from the layer of containers at the downstream station.

\* \* \* \* \*